United States Patent
Kwak et al.

(10) Patent No.: US 12,010,654 B2
(45) Date of Patent: Jun. 11, 2024

(54) METHOD FOR V2X OPERATION BASED ON RESTRUCTURING OF PLURALITY OF RESOURCES IN WIRELESS COMMUNICATION SYSTEM AND TERMINAL USING SAME

(71) Applicant: LG Electronics Inc., Seoul (KR)

(72) Inventors: Kyuhwan Kwak, Seoul (KR); Seungmin Lee, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 658 days.

(21) Appl. No.: 17/267,589

(22) PCT Filed: Aug. 2, 2019

(86) PCT No.: PCT/KR2019/009677
§ 371 (c)(1),
(2) Date: Feb. 10, 2021

(87) PCT Pub. No.: WO2020/032492
PCT Pub. Date: Feb. 13, 2020

(65) Prior Publication Data
US 2021/0314919 A1 Oct. 7, 2021

Related U.S. Application Data

(60) Provisional application No. 62/717,709, filed on Aug. 10, 2018.

(51) Int. Cl.
*H04W 72/02* (2009.01)
*H04W 4/40* (2018.01)
(Continued)

(52) U.S. Cl.
CPC ............. *H04W 72/02* (2013.01); *H04W 4/40* (2018.02); *H04W 72/0446* (2013.01); *H04W 92/18* (2013.01)

(58) Field of Classification Search
CPC ... H04L 5/0044; H04L 5/0053; H04L 5/0091; H04W 4/40; H04W 72/02; H04W 72/0446; H04W 92/18
See application file for complete search history.

(56) References Cited

U.S. PATENT DOCUMENTS

2017/0272384 A1* 9/2017 Lee .................. H04W 28/0278
2018/0042043 A1* 2/2018 Babaei ................. H04L 5/0082
(Continued)

FOREIGN PATENT DOCUMENTS

WO WO2017171523 10/2017
WO WO2017176099 10/2017

OTHER PUBLICATIONS

Intel Corporation, "On Sidelink Resource Pool Sharing for eNB-Controlled and UE-Autonomous V2V Transmission Modes," R1-1806484, 3GPP TSG RAN WG1 Meeting #93, Busan, Korea, dated May 21-25, 2018, 5 pages.
(Continued)

*Primary Examiner* — Kashif Siddiqui
(74) *Attorney, Agent, or Firm* — Fish & Richardson P.C.

(57) ABSTRACT

The present disclosure provides a method for performing a vehicle-to-everything (V2X) operation by a terminal in a wireless communication system, the method comprising: restructuring a plurality of uplink resources in order to configure a resource pool associated with the V2X operation; and performing the V2X operation on the plurality of restructured uplink resources.

9 Claims, 30 Drawing Sheets

(51) Int. Cl.
*H04W 72/0446* (2023.01)
*H04W 92/18* (2009.01)

(56) References Cited

U.S. PATENT DOCUMENTS

| | | | |
|---|---|---|---|
| 2018/0049193 A1* | 2/2018 | Belleschi | H04W 72/0446 |
| 2018/0317123 A1* | 11/2018 | Chen | H04W 72/21 |
| 2019/0014564 A1* | 1/2019 | Lee | H04W 72/121 |
| 2019/0342910 A1* | 11/2019 | Cao | H04L 5/0091 |
| 2021/0028891 A1* | 1/2021 | Zhou | H04W 4/40 |
| 2021/0160876 A1* | 5/2021 | Osawa | H04W 72/0446 |
| 2021/0336756 A1* | 10/2021 | Chae | H04L 1/1614 |

OTHER PUBLICATIONS

Panasonic, "Discussion on remaining issues on PUCCH resource allocation," R1-1806183, 3GPP TSG RAN WG1 Meeting #93, Busan, Korea, dated May 21-25, 2018, 6 pages.

Potevio, "Resource allocation mechanism for PC5 interface of V2X," R2-161636, 3GPP TSG-RAN WG2 #93, St. Julian's, Malta, dated Feb. 15-19, 2016, 4 pages.

* cited by examiner

METHOD FOR V2X OPERATION BASED ON RESTRUCTURING OF PLURALITY OF RESOURCES IN WIRELESS COMMUNICATION SYSTEM AND TERMINAL USING SAME

CROSS-REFERENCE TO RELATED APPLICATIONS

This application is a National Stage application under 35 U.S.C. § 371 of International Application No. PCT/KR2019/009677, filed on Aug. 2, 2019, which claims the benefit of U.S. Provisional Application No. 62/717,709 filed on Aug. 10, 2018. The disclosures of the prior applications are incorporated by reference in their entirety.

BACKGROUND OF THE DISCLOSURE

Field of the Disclosure

The present disclosure relates to wireless communication, and more particularly, to a V2X operation method based on restructuring of a plurality of resources in a wireless communication system and a terminal using the method.

Related Art

Recently, in 3GPP standardization organization, it has been considered a network slicing technique for implementing a plurality of logical networks on a single physical network in the NR system, which is 5G wireless communication system. To this end, the logical networks needs to be capable of supporting services having various requirements (e.g., enhanced Mobile Broadband (eMBB), massive Machine Type Communication (mMTC), Ultra Reliable Low Latency Communication (URLLC), etc.). In addition, in the physical layer system of the NR system, it has been considered a technique for supporting an orthogonal frequency division multiplexing (OFDM) scheme in which a variable numerology is applicable according to the various services. In other words, in the NR (New RAT) system, an OFDM scheme (or a multiple access scheme) in which independent numerologies are applied in each time and frequency resource region may be supported.

Basically, in the case of a resource used as a downlink in Uu interface-based communication (base station-terminal communication), performance may be greatly degraded due to interference when a sidelink operation is performed on the corresponding resource, and thus, it is possible to perform a sidelink operation for a resource used as an uplink in the Uu interface-based communication.

In this case, the present disclosure is to provide a V2X operation method based on restructuring of a plurality of resources and a terminal using the method.

SUMMARY

The present disclosure provides a V2X operation method based on restructuring of a plurality of resources in a wireless communication system and a terminal using the method.

In an aspect, a method for performing a vehicle-to-everything (V2X) operation performed by a user in a wireless communication system is provided. The method may comprise restructuring a plurality of uplink resources for a configuration of a resource pool related to the V2X operation and performing the V2X operation on the plurality of restructured uplink resources.

The plurality of uplink resources may be a cell-specifically configured resource.

The plurality of uplink resources may be restructured in a preset interval unit.

The preset interval may be a basic unit for configuring the resource pool.

The preset interval may be based on units of symbols.

The symbols configuring the preset interval may be configured to be spaced apart from each other.

When the interval of the plurality of uplink resources in which the restructuring is performed is not a multiple of the preset interval, the uplink resources remaining in the interval of the plurality of uplink resources may be excluded from the resource pool configuration.

The preset interval may be defined in advance or set from a base station.

The plurality of uplink resources may be restructured in an interval unit configured to have a different length.

In another aspect, a terminal performing a vehicle-to-everything (V2X) operation is provided. The terminal may comprise a transceiver that transmits and receives a wireless signal and a processor that is operated by being coupled to the transceiver, the processor restructures a plurality of uplink resources for a configuration of a resource pool related to the V2X operation and performs the V2X operation on the plurality of restructured uplink resources.

In other aspects, a method for transmitting information related to a vehicle-to-everything (V2X) operation performed by a user in a wireless communication system is provided. The method may comprise transmitting information related to the V2X operation, the information related to the V2X operation is information related to restructuring the plurality of uplink resources to configure the resource pool related to the V2X operation.

According to the present disclosure, the V2X operation may be performed based on the restructuring of the plurality of resources. Accordingly, the terminal can more efficiently determine the resource on which the V2X operation is performed in order to configure the resource pool for the sidelink, so the efficiency of the wireless communication can be increased.

DESCRIPTION OF EXEMPLARY EMBODIMENTS

Hereinafter, terms or abbreviations that are not separately defined may be defined in 3GPP TS 36 series or TS 38 series.

Figure 1:
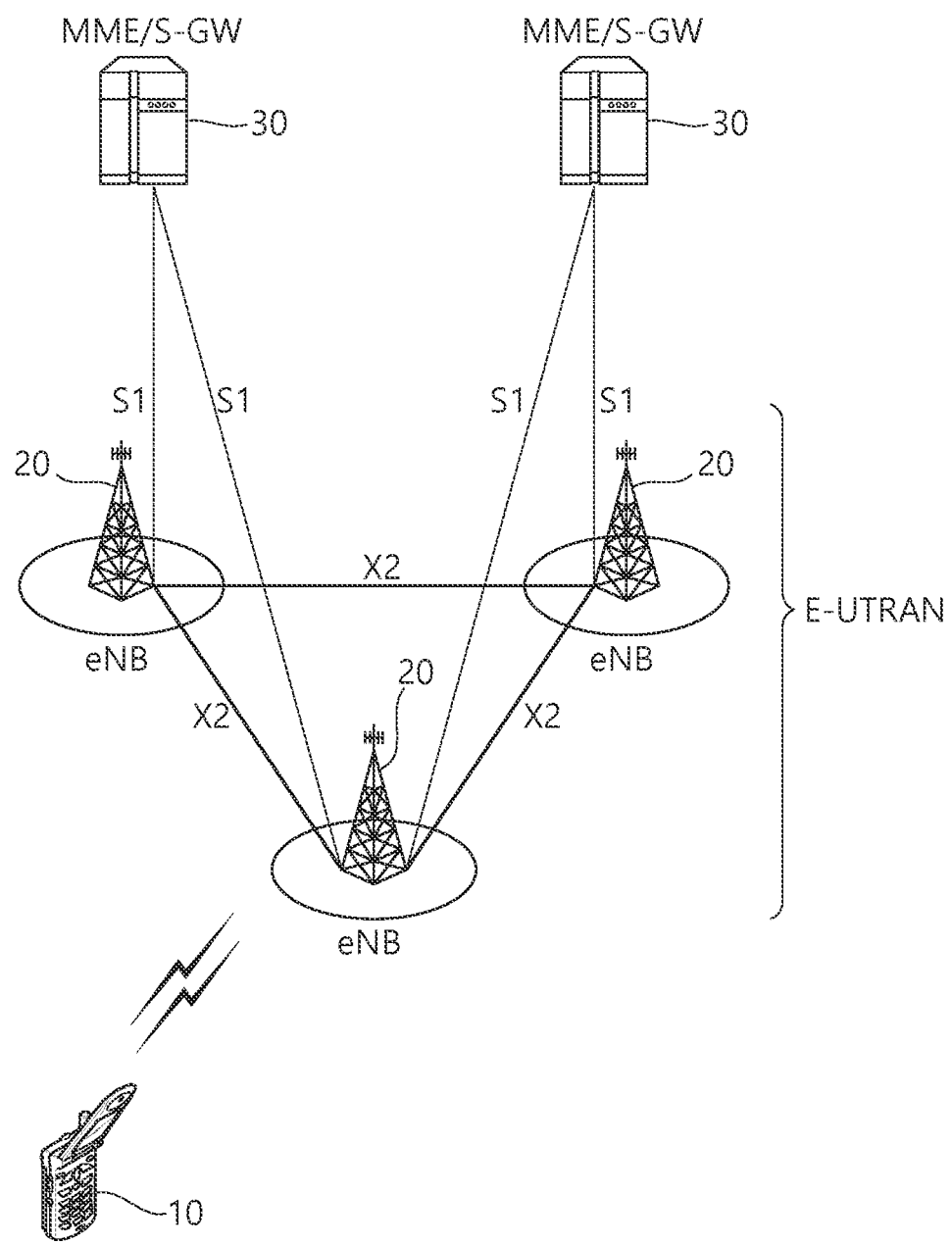
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
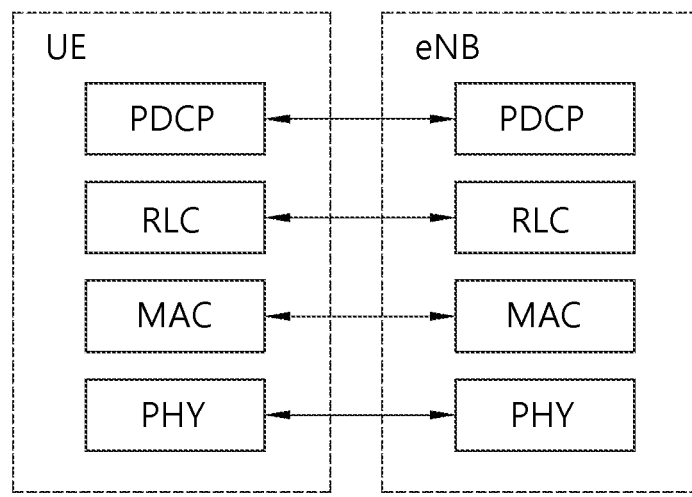
FIG. 2 is a diagram showing a wireless protocol architecture for a user plane.
Figure 3:
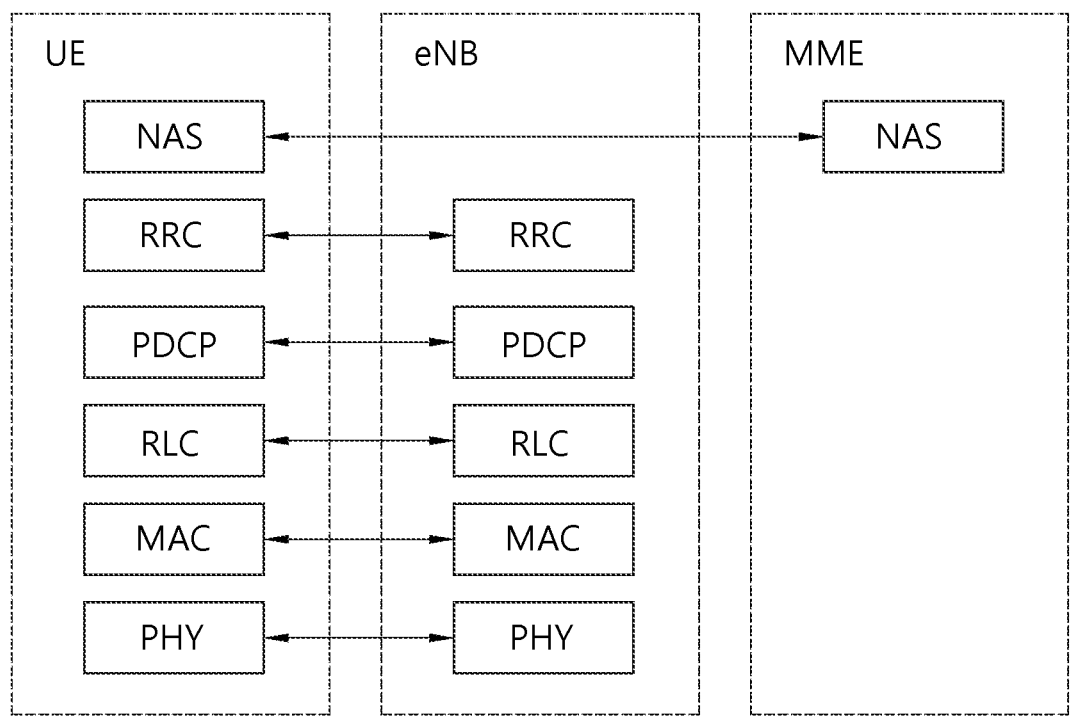
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Figure 4:
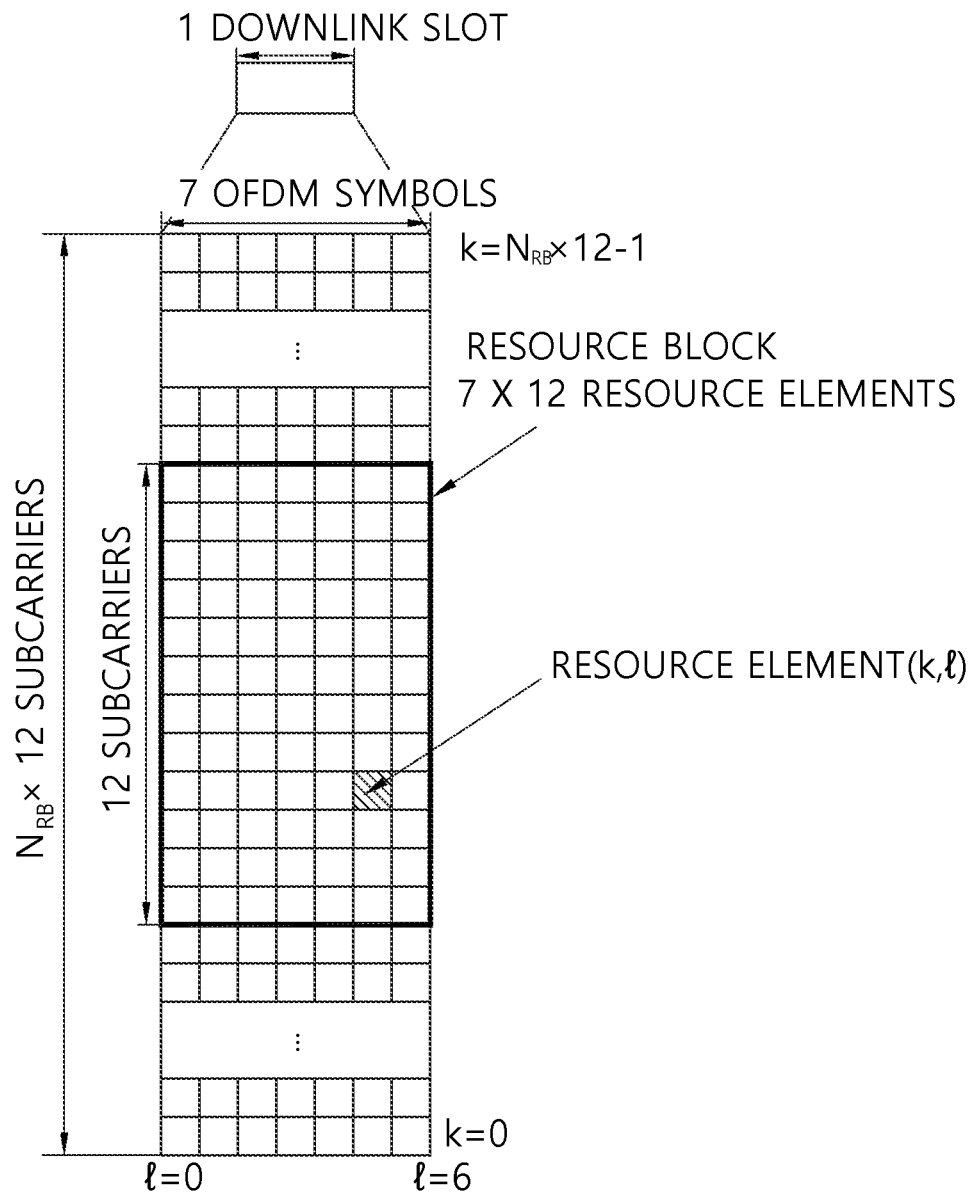
FIG. 4 shows an example of a downlink/uplink (DL/UL) slot structure in a wireless communication system.

FIG. 4 shows an example of a downlink/uplink (DL/UL) slot structure in a wireless communication system. In particular, FIG. 4 shows a structure of a resource grid of a 3GPP LTE (-A) system. There is one resource grid per antenna port.

A slot includes a plurality of orthogonal frequency division multiplexing (OFDM) symbols in a time domain and includes a plurality of resource blocks (RBs) in a frequency domain. The OFDM symbol also refers to one symbol interval. Referring to FIG. 4, a signal transmitted in each slot may be represented by a resource grid including $N^{DL/UL}_{RB}*N^{RB}_{sc}$ subcarriers and $N^{DU/UL}_{symb}$ OFDM symbols. Here, $N^{DL}_{RB}$ denotes the number of resource blocks (RBs) in a downlink slot, and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in the downlink slot, and $N^{UL}_{symb}$ denotes the number of OFDM symbols in the UL slot. $N^{RB}_{sc}$ denotes the number of subcarriers constituting one RB.

An OFDM symbol may be called an SC-FDM (Single Carrier Frequency Division Multiplexing) symbol according to a multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 4 illustrates a subframe in which a slot includes 7 OFDM symbols for convenience, embodiments of the present disclosure may be equally applied to subframes having different numbers of OFDM symbols. Referring to FIG. 4, each OFDM symbol includes $N^{DL/UL}_{RB}*N^{RB}_{sc}$ subcarriers in the frequency domain. Subcarrier types may be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency ($f_o$) during OFDM signal generation or frequency up-conversion. The carrier frequency is also called a center frequency.

One RB is defined by $N^{DL/UL}_{symb}$ (e.g., 7) consecutive OFDM symbols in the time domain and $N^{RB}_{sc}$ (e.g. 12) consecutive subcarriers in the frequency domain. For reference, a resource composed of an OFDM symbol and a subcarrier is called a resource element (RE) or a tone. Accordingly, an RB is composed of $N^{DL/UL}_{symb}*N^{RB}_{sc}$. Each RE in the resource grid may be uniquely defined by an index pair (k, l) in a slot. Here, k is an index in the range of 0 to $N^{DL/UL}_{RB}*N^{RB}_{sc}-1$ in the frequency domain and l is an index in the range of 0 to $N^{DL/UL}_{symb}-1$.

Two RBs that occupy $N^{RB}_{sc}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N^{DL}_{VRB}-1$, and $N^{DL}_{VRB}=N^{DL}_{RB}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as an VRB pair.

Figure 5:
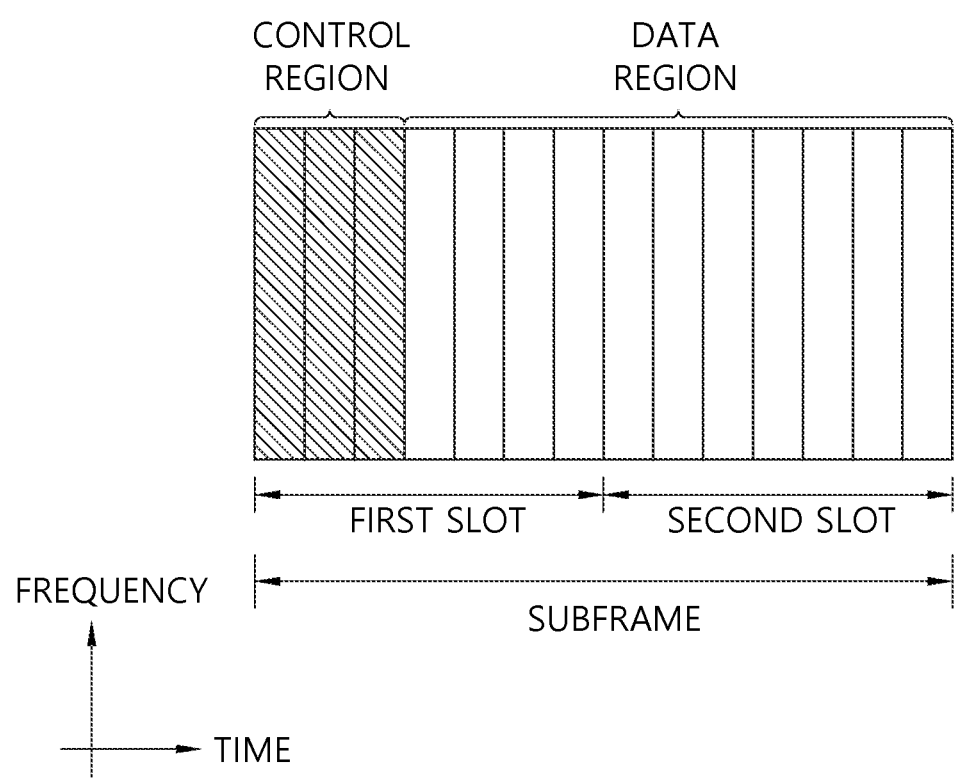
FIG. 5 illustrates a downlink (DL) subframe structure used in the 3GPP LTE/LTE(-A) system.

FIG. 5 illustrates a downlink (DL) subframe structure used in the 3GPP LTE/LTE(-A) system.

A DL subframe is divided into a control region and a data region in a time domain. Referring to FIG. 3, a maximum of 3 (or 4) OFDM symbols located in a front part of a first slot of a subframe correspond to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ ACK/NACK as a response to UL transmission.

Control information transmitted via a PDCCH is referred to as downlink control information (DCI). The DCI includes resource allocation information for a UE or a UE group and other control information. For example, the DCI includes transmission format and resource allocation information of a DL shared channel (DL-SCH), transmission format and resource allocation information of a UL shared channel (UL-SCH), paging information on a paging channel (PCH), system information on a DL-SCH, resource allocation information of a higher-layer control message such as a random access response transmitted on a PDSCH, a transmission (Tx) power control command set for individual UEs in a UE group, a Tx power control command, activation indication information of voice over IP (VoIP), etc. The size and usage of the DCI carried by one PDCCH may be changed according to DCI format and the size of the DCI may be changed according to a coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked (or scrambled) with an identifier (e.g. a radio network temporary identifier (RNTI)) according to an owner or usage of the PDCCH. If the PDCCH is for a specific UE, a cell-RNTI (C-RNTI) of the UE may be masked to the CRC. If the PDCCH is for a paging message, a paging identifier (e.g. paging-RNTI (P-RNTI)) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to 9 REGs and one REG corresponds to 4 REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (i.e. a PCFICH and a PHICH). A DCI format and the number of DCI bits are determined according to the number of CCEs.

CCEs are numbered and consecutively used. In order to simplify a decoding process, a PDCCH having a format composed of n CCEs may start from only a CCE having a number corresponding to a multiple of n. The number of CCEs used to transmit a specific PDCCH, that is, a CCE aggregation level, is determined by a BS according to channel state. For example, in case of a PDCCH for a UE having a good DL channel (e.g. a UE adjacent to a BS), one CCE may be sufficient. However, in case of a PDCCH for a UE having a bad channel (e.g. a UE located at a cell edge), 8 CCEs may be required to obtain sufficient robustness.

Figure 6:
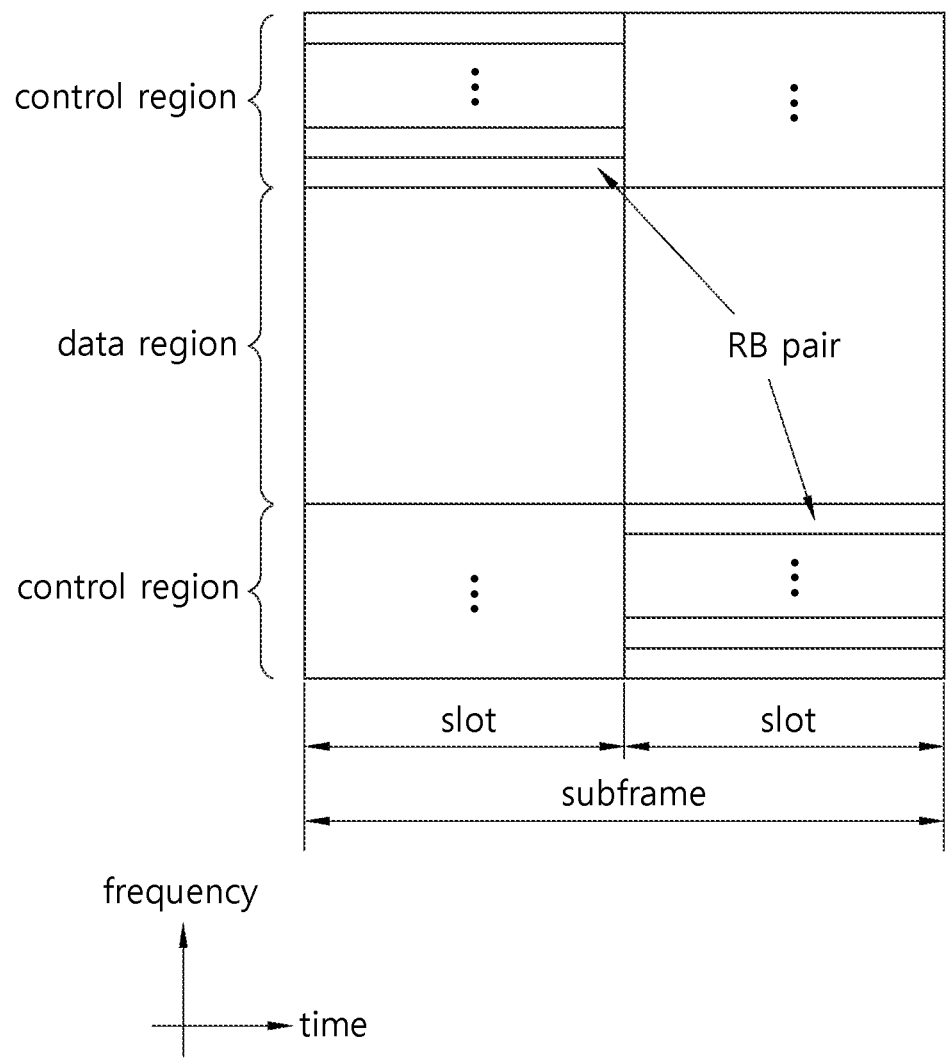
FIG. 6 illustrates a structure of an uplink subframe used in the 3GPP LTE/LTE(-A) system.

FIG. 6 illustrates a structure of an uplink subframe used in the 3GPP LTE/LTE(-A) system.

Referring to FIG. 6, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUS CH may be indicated by higher layers.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 7:
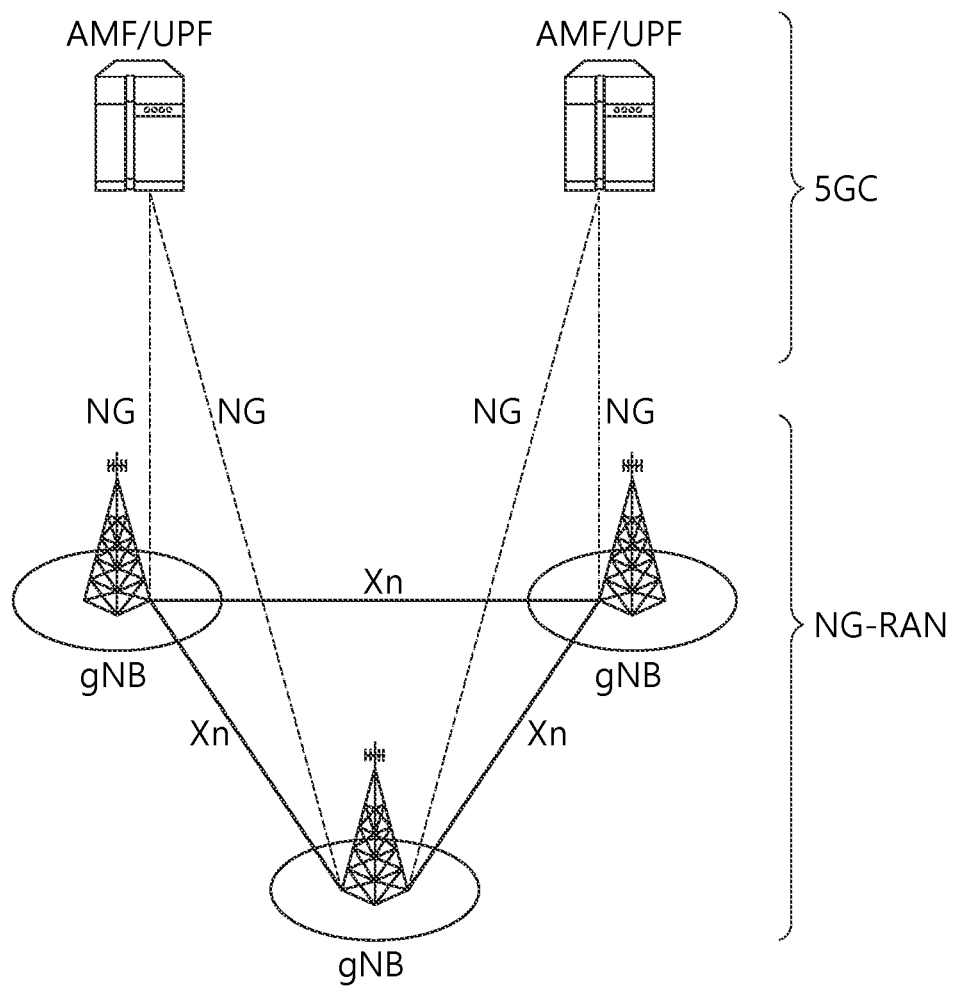
FIG. 7 illustrates a system structure of a new generation radio access network (NG-RAN) to which NR is applied.

FIG. 7 illustrates a system structure of a new generation radio access network (NG-RAN) to which NR is applied.

Referring to FIG. 7, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 8:
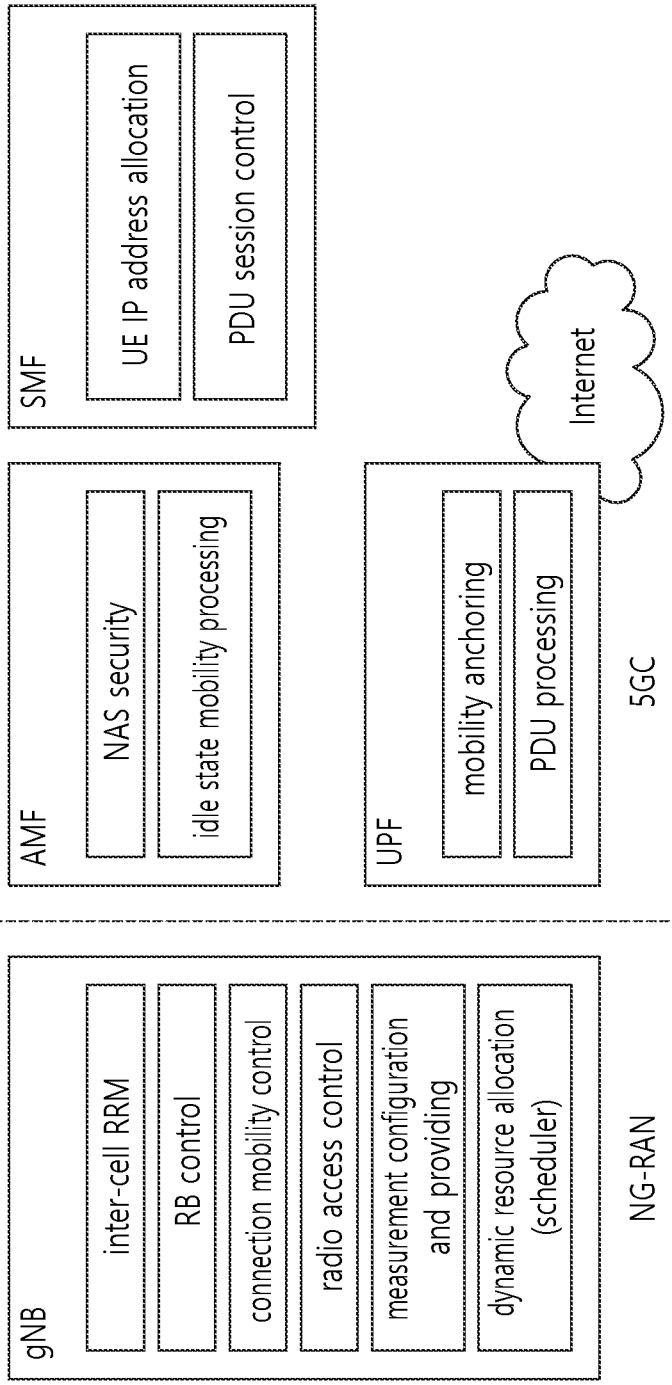
FIG. 8 illustrates functional partitioning between NG-RAN and 5GC.

FIG. 8 illustrates functional partitioning between NG-RAN and 5GC.

Referring to FIG. 8, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

<D2D (Device-to-Device) Operation>

Hereinafter, it is described the components for device-to-device communication (D2D) technique.

Figure 9:
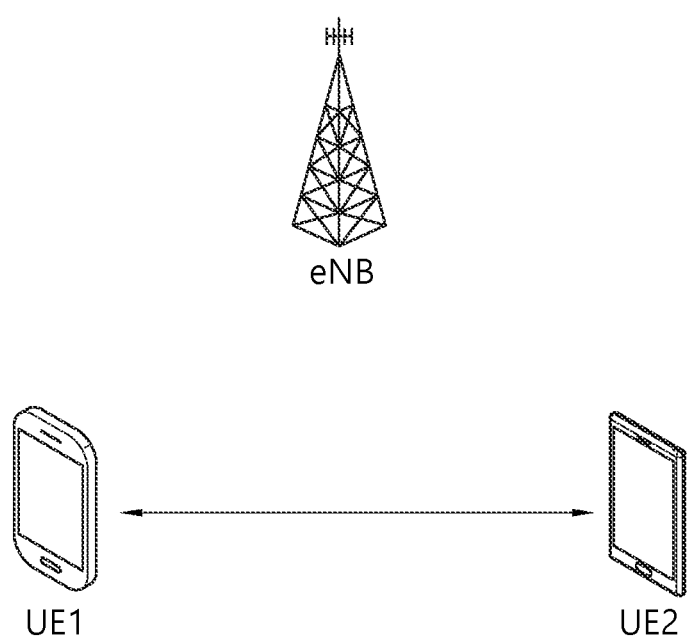
FIG. 9 illustrates a system architecture to which a D2D operation is applied.

FIG. 9 illustrates a system architecture to which a D2D operation is applied.

In FIG. 9, a UE means a user UE, but in the case that a network equipment like an eNB transmits and receives a signal according to a communication scheme between UEs, the network equipment like an eNB may also be regarded as a kind of UE.

Hereinafter, UE1 may be operated to select a resource unit corresponding to a specific resource in a resource pool that means a set of a series of resources and transmit a D2D signal by using the corresponding resource unit.

UE2, which is a reception UE for the transmission, may be configured with a resource pool in which UE1 may transmit a signal and may detect the signal of UE1.

Here, the resource pool may be informed by an eNB in the case that UE1 is within a connection coverage of the eNB, and may be informed by another UE or determined as a predetermined resource in the case that UE 1 is out of a connection coverage of the eNB.

Generally, a resource pool includes multiple resource units, and each UE may select one or multiple resource units and use the one or multiple resource units in its own D2D signal transmission.

Figure 10:
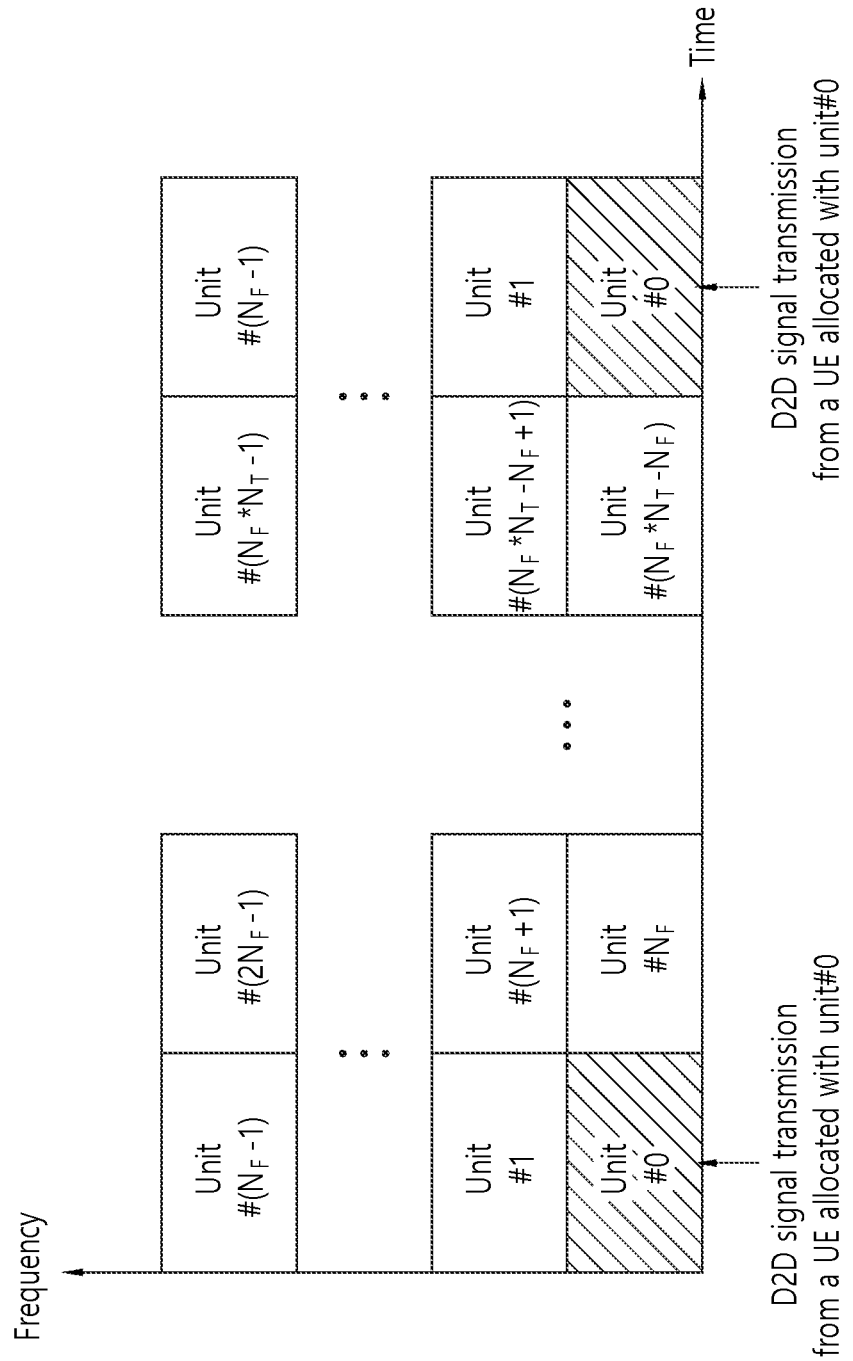
FIG. 10 illustrates an example of a resource unit on time and frequency resource.

FIG. 10 illustrates an example of a resource unit on time and frequency resource.

The example of FIG. 10 corresponds to the case that the entire frequency resource resources are divided by NF, and the entire time resources are divided by NT, and accordingly total NF*NT resource units are defined.

In the example of FIG. 10, the resource pool is repeated in a period of NT subframe. Distinctively, a single resource unit may be present repeatedly as shown in FIG. 10. Alternatively, in order to obtain diversity effect in a time or frequency domain, an index of a physical resource unit which is mapped to a single logical resource unit may be changed in a predetermined pattern depending on a time.

In such a resource unit architecture, a resource pool may mean a set of resource units that a UE intended to transmit a D2D signal uses in a transmission.

The resource pool described above may be sub divided into several types. First, the resource pool may be distinguished according to a content of a D2D signal which is transmitted in each resource pool.

As an example, the contents of the following D2D signal may be distinguished, and a separate resource pool may be configured for each of them.

Scheduling Assignment (SA) or D2D (Sidelink) Control Channel:

A signal including information such as a position of resource of a D2D data channel transmitted in a subsequent or a same subframe (SF) by each transmission UE, MCS (modulation and coding scheme) or MIMO (Multiple Input Multiple Output) transmission scheme required to demodulate other data channel, and a timing advance.

This signal may be transmitted with being multiplexed with D2D data on the same resource unit, and in this case, a SA resource pool may mean a pool of resources in which SA and D2D data are multiplexed and transmitted. This may also be called the other name, D2D (sidelink) control channel.

D2D Data Channel:

A pool of resources that a transmission UE uses for transmitting user data by using a resource designated by SA. In the case that it is available to be multiplexed with D2D data and transmitted on the same resource unit, in the resource pool for D2D data channel, only the D2D data channel excluding SA information is transmitted.

In other words, the resource element which was used for transmitting the SA information in an individual resource unit in a SA resource pool is still used for transmitting D2D data in the D2D data channel resource pool.

Discovery Channel:

A resource pool for a message in which information such as an ID of a transmission UE is transmitted and enables for an adjacent UE to discover the transmission UE.

Even in the case that a content of D2D signal described above is the same, depending on a transmission and reception attribute of D2D signal, different resource pool may be used.

As an example, even in the case of the same D2D data channel or a discovery message, depending on a transmission timing determination scheme of a D2D signal (e.g., whether it is transmitted on a reception timing of synchronization reference signal or transmitted by applying a predetermined timing advance), a resource allocation scheme (e.g., whether a transport resource of an individual signal is designated by an eNB to an individual transmission UE or an individual transmission UE selects an individual signal transport resource autonomously in a pool), a signal format (e.g., the number of symbols occupied by each D2D signal in a subframe or the number of subframes used for transmitting a single D2D signal), a signal strength from an eNB or a transmission power strength of a D2D UE, it may be further distinguished as different resource pool.

For the convenience of description, in a D2D communication, a method that an eNB directly indicates a transport resource of a D2D transmission UE is called Mode 1, and a transport resource region is preconfigured or a method that an eNB designates a transport resource region and a UE directly selects a transport resource is called Mode 2.

For a D2D discovery, a case that an eNB directly indicates a resource is called Type 2, and a case that a UE directly selects a transport resource in a preconfigured resource region, or a resource region indicated by an eNB is called Type 1.

The above mentioned D2D may also be called sidelink, and SA may be called physical sidelink control channel (PSCCH). A D2D synchronization signal may be called sidelink synchronization signal (SSS), and the control channel for transmitting the most basic information before a D2D communication transmitted with the SSS may be called Physical sidelink broadcast channel (PSBCH), or in other name, Physical D2D synchronization channel (PD2DSCH).

A signal for a specific UE to inform that the UE is present in a neighbor may include an ID of the specific UE, and such a channel may be called physical sidelink discovery channel (PSDCH).

In Rel. 12 D2D, only a D2D communication UE transmits PSBCH together with SSS, and owing to this, a measurement of SSS is performed by using a DMRS of PSBCH. An out-coverage UE measures a DMRS of PSBCH and measures RSRP of the signal and determines whether the UE itself becomes a synchronization source.

<NR (New RAT)>

As more communication devices require a greater communication capacity, there emerges a need for enhanced mobile broadband communication compared to the existing radio access technology (RAT). In addition, massive machine type communications (MTC) providing various services anywhere and at any time by connecting multiple devices and things is also one of important issues to be taken into consideration in the next-generation communication. Furthermore, the design of a communication system in which services/UEs sensitive to reliability and latency are taken into consideration is also discussed.

As described above, the introduction of a next-generation RAT in which enhanced mobile broadband (eMBB) communication, massive MTC (mMTC) and ultra-reliable and low latency communication (URLLC) are taken into consideration is now discussed. In the present disclosure, the corresponding technology is commonly called NR, for convenience sake.

<Frame Structure for NR>

Figure 11:
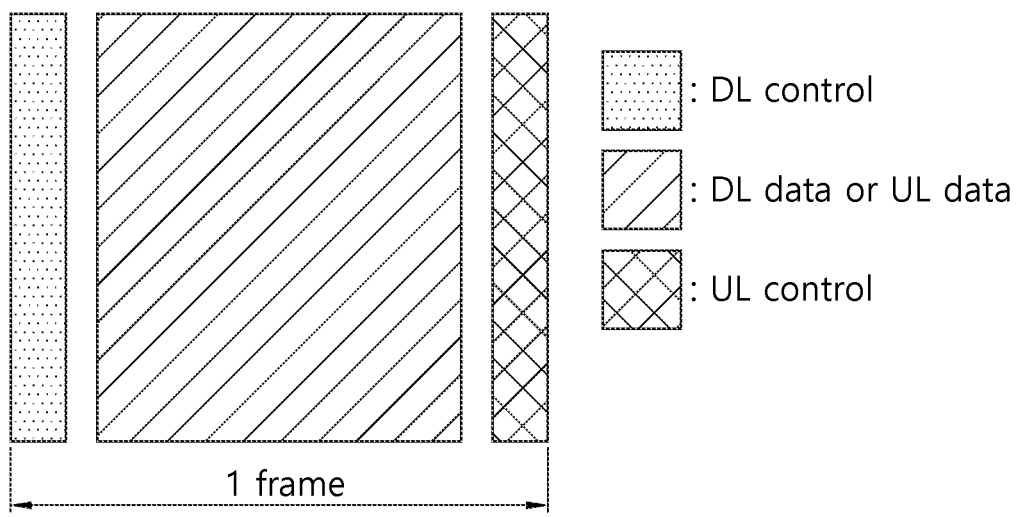
FIG. 11 schematically illustrates an example of a frame structure in the NR system.

FIG. 11 schematically illustrates an example of a frame structure in the NR system.

Referring to FIG. 11, the frame structure of NR is characterized in the self-contained structure that includes all of DL control channel, DL or UL data, UL control channel, and the like in a single frame unit.

At this time, in the DL control channel, DL data scheduling information, UL data scheduling information, and the like may be transmitted, and in the UL control channel, ACK/NACK information for DL data, CSI information (modulation and coding scheme information, MIMO transmission related information, etc.), a scheduling request, and the like may be transmitted.

In FIG. 11, a time gap for DL-to-UL or UL-to-DL switching may be present between the control region and the data region.

In addition, one of DL control/DL data/UL data/UL control may not be configured in a single frame. Alternatively, an order for each channel (e.g., DL control/DL data/UL control/UL data or UL control/UL data/DL control/DL data, etc.) included in a single frame may be changed.

The frame structure of the NR system described with the example of FIG. 8 may be distinguished into 4 types as shown in FIG. 9, largely.

Figure 12:
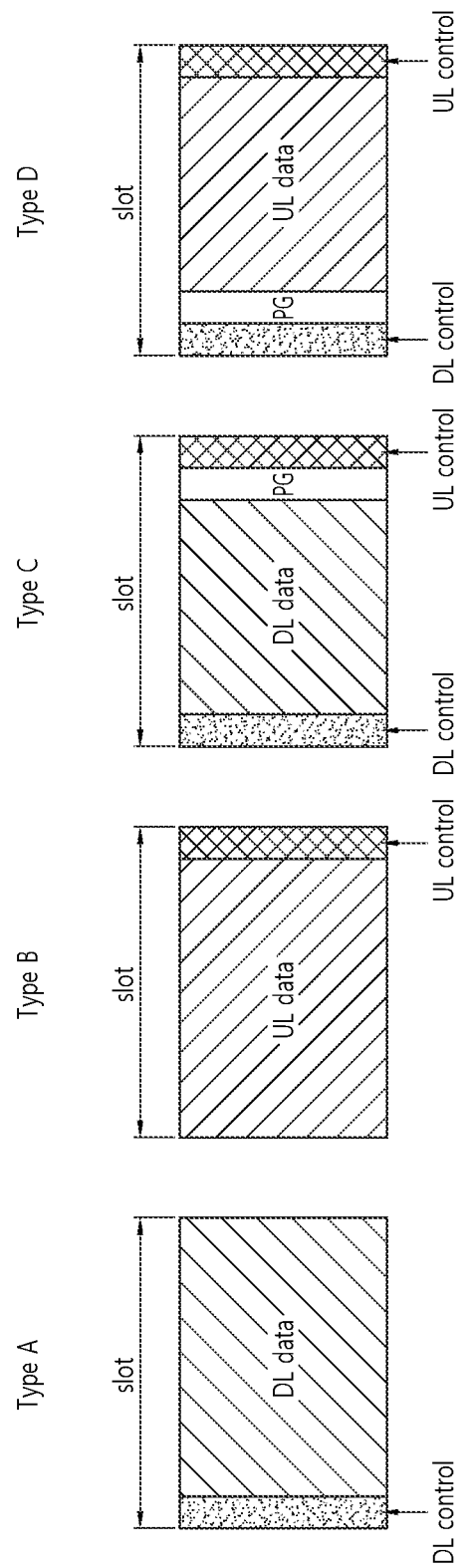
FIG. 12 schematically illustrates another example of a frame structure in the NR system.

FIG. 12 schematically illustrates another example of a frame structure in the NR system.

Type A: DL Control+DL Data

That is, according to Type A, a single slot (or frame) includes a DL control region and a DL data region.

Type B: UL Data+UL Control

That is, according to Type B, a single slot (or frame) includes a UL data region and a UL control region. Here, the UL control may be omitted in dynamic manner.

Type C: DL Control+DL Data+GP (Guard Period)+UL Control

That is, according to Type C, a single slot (or frame) includes a DL control region, a DL data region, a GP (guard period) region and a UL control region.

Type D: DL Control+GP+UL Data+UL Control

That is, according to Type D, a single slot (or frame) includes a DL control region, a GP region, a UL data region and a UL control region. Here, the positions of the UL data and the UL control may be changed, or the UL control may be omitted in dynamic manner.

<Analog Beamforming>

In a millimeter wave (mmW) system, since a wavelength is short, multiple antenna elements may be installed in the same area. That is, considering that the wavelength at 30 GHz band is 1 cm, a total of 100 antenna elements may be installed in a 5 by 5 cm panel at intervals of 0.5 lambda (wavelength) in the case of a 2-dimensional array. Therefore, in the mmW system, it is available to improve the coverage or throughput by increasing the beamforming (BF) gain using multiple antenna elements.

In this case, in the case that each antenna element may include a transceiver unit (TXRU) to enable adjustment of transmit power and phase, independent beamforming per frequency resource is available. However, installing TXRUs in all of the about 100 antenna elements is less feasible in terms of cost. Therefore, a method of mapping a plurality of antenna elements to one TXRU and adjusting a direction of a beam using an analog phase shifter has been considered. However, the analog beamforming method is disadvantageous in that frequency selective beamforming is impossible because only one beam direction is generated over the entire band.

As an intermediate form of digital beamforming (BF) and analog beamforming (BF), hybrid BF with B TXRUs that are fewer than Q antenna elements may be considered. In this case, the number of beam directions that can be transmitted at the same time is limited to B or less, which depends on the connection scheme of B TXRUs and Q antenna elements.

Hereinafter, the present disclosure will be described.

The aforementioned D2D communication may be extended and applied to signal transmission/reception between vehicles, and communication related to vehicles is specifically called V2X (vehicle-to-everything) communication. In V2X, the term "X" is pedestrian (communication between a vehicle and a device carried by an individual), vehicle (communication between vehicles) (V2V), infrastructure/network (communication between a vehicle and a roadside unit (RSU)/network (ex) RSU is a transportation infrastructure entity (ex) an entity transactions or a stationary UE)) (V2I/N), etc. A device (related to V2P communication) possessed by a pedestrian (or person) is named "P-UE", and a device (related to V2X communication) installed in a vehicle is named "V-UE". In the present disclosure, the term "ENTITY" may be interpreted as at least one of P-UE, V-UE, and RSU (/network/infrastructure).

Here, as an example, a V2X communication mode may be divided into (A) a mode (MODE #3) in which the base station signals (/controls) V2X message transmission (/reception)-related scheduling information (on a V2X resource pool pre-configured (/pre-signaled)) (representatively) (from (the base station (/network)) in case of following a mode (e.g., LTE(A) operated based on an instruction of the base station (e.g., a UE located within base station communication coverage (and/or in an RRC_CONNECTED state)

is a main target) and/or (B) a mode (MODE #4) in which a UE (autonomously) determines (/controls) V2X message transmission (/reception)-related scheduling information (a V2X resource pool pre-configured (/pre-signaled) from a base station (/network)) in case where a terminal (or user equipment (UE)) follows a mode (e.g., LTE(A) operated based on sensing or the like with the degree of freedom (e.g., a UE positioned inside/outside base station communication coverage) (and/or of an RRC_CONNECTED/IDLE state) is a main target).

Here, as an example, in the present disclosure, the wording "sensing operation" may be interpreted as a PSSCH DM-RS sequence-based PSSCH-RSRP measurement operation (scheduled by a decoding-successful PSCCH) and/or a (V2X resource pool-related subchannel-based) S-RSSI measurement operation.

Hereinafter, types of V2X services and requirements therefor will be briefly described with reference to the drawings.

Figure 13:
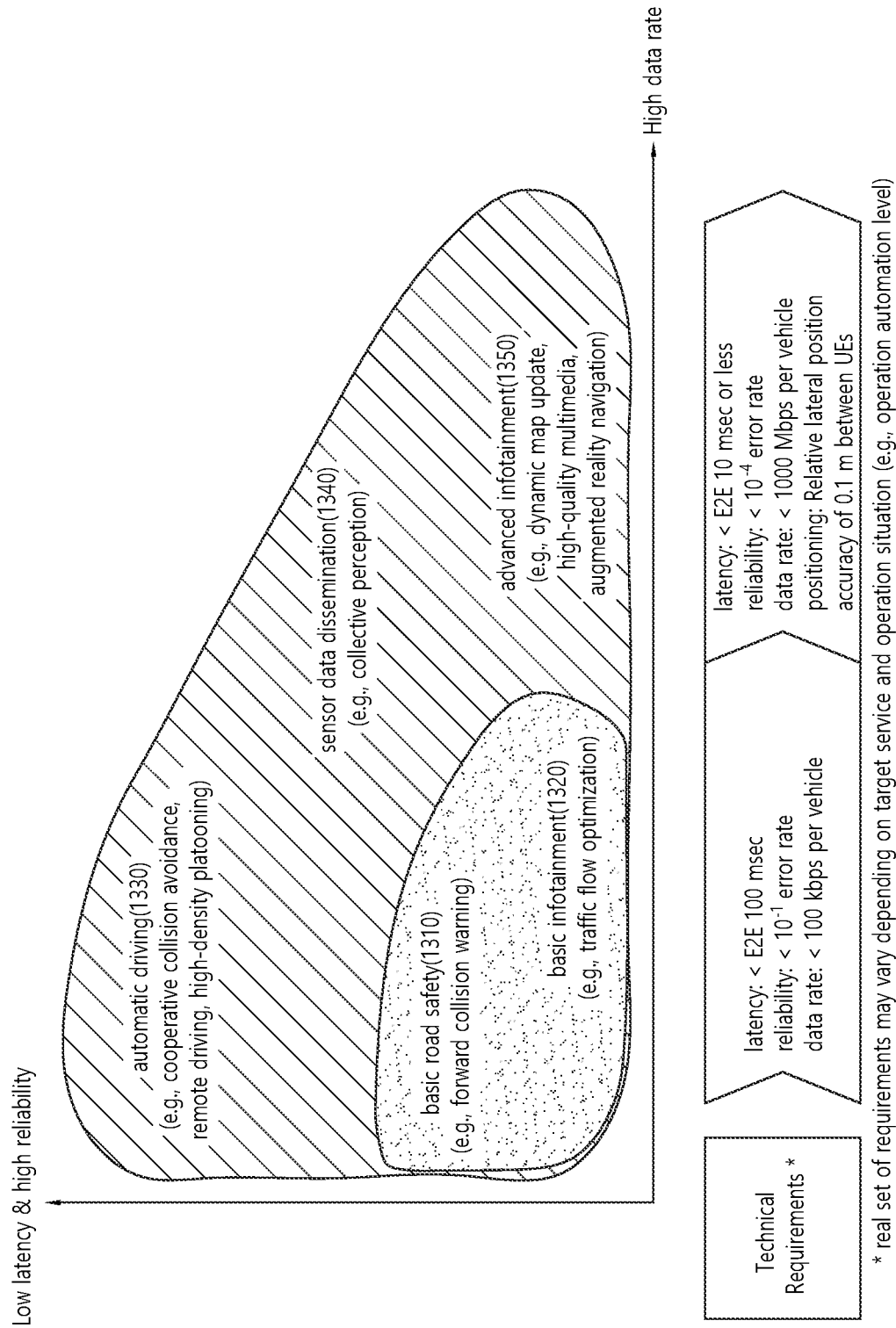
FIG. 13 schematically shows the types of V2X services and requirements for them.

FIG. 13 schematically shows the types of V2X services and requirements for them.

According to FIG. 13, the types of services supported by V2X may be expressed as a graph in which one axis (i.e., a vertical axis in FIG. 13) represents latency and reliability and the other axis (i.e., a horizontal axis in FIG. 13) represents data rate.

First, as an example of the types of services supported by V2X, there may be use cases such as latency less than E2E (end-to-end) 100 msec, reliability less than $10^{-1}$ error rate and/or basic road safety 1310 requiring a data rate less than 100 kbps per vehicle, and/or basic infotainment 1320.

Here, an example of the basic road safety 1310 may include a forward collision warning or the like. An example of the basic infotainment 1320 may include traffic flow optimization or the like.

In addition, as another example of the types of services supported by V2X, there may be use cases such as latency less than E2E 10 msec, reliability less than $10^4$ error rate, a data rate less than 1000 Mbps per vehicle, automated driving 1330 requiring relative position accuracy of 0.1 m between terminals, sensor data dissemination 1340, and/or advanced infotainment 1350.

Here, examples of the automated driving 1330 may include cooperative collision avoidance, remote driving, high-density platooning, and the like. Examples of the sensor data dissemination 1340 may include collective perception or the like. Examples of the advanced infotainment 1350 may include dynamic map update, high-quality multimedia, augmented reality navigation, and the like.

Meanwhile, in a next-generation communication system, various use cases may be supported. For example, services for communication such as autonomous vehicles, smart cars, or connected cars may be considered. For these services, each vehicle may exchange information as a communicatable terminal, select resources for communication with or without a help of a BS, and exchange messages between terminals.

Thus, the present disclosure proposes a new method that can be applied to resource pool configuration in vehicle object communication.

The documents and/or embodiments in the present disclosure may be regarded as one proposed method, but combinations between the respective documents and/or embodiments may also be considered as a new method. In addition, it goes without saying that the document is not limited to the embodiments presented in the present disclosure and is not limited to a specific system. All (parameters), (operations), (combination of each parameter and/or operation), (whether to apply the parameters and/or operations), and/or (whether to apply a combination of each parameter and/or operation) of the present disclosure may be (pre)configured in the terminal through higher layer signaling and/or physical layer signaling by the based station, or may be defined in the system in advance.

The TTI of the present disclosure may correspond to a unit of various lengths such as a sub-slot/slot/subframe or a basic unit which is a basic unit of transmission, and the terminal of the present disclosure may correspond to various types of devices, such as a vehicle and a pedestrian terminal.

Currently, in the case of NR, a configuration method for operating based on TDD and more dynamically changing a corresponding TDD-related configuration is defined. A slot defined as 14 symbols in the NR may be configured in various configurations (for example, uplink symbol(s), downlink symbol(s), and flexible symbol(s)), and hereinafter, an example of dynamically changing the TDD-related setting will be described with reference to the drawings.

Figure 14:
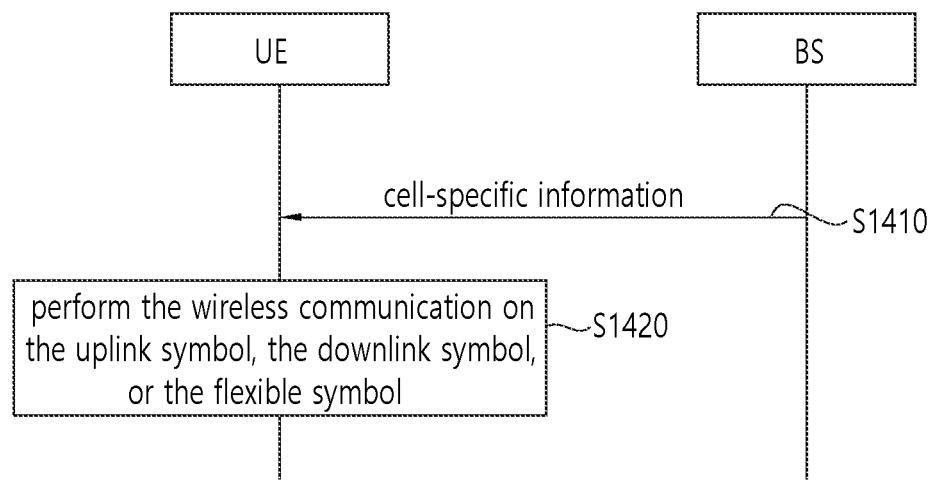
FIG. 14 is a flowchart of an example in which a terminal receives cell-specific configuration information from a base station.

FIG. 14 is a flowchart of an example in which a terminal receives cell-specific configuration information from a base station.

According to FIG. 14, the terminal may receive cell-specific information through the base station (S1410). Here, the terminal may semi-statically configure uplink, downlink, and flexible symbols through cell-specific higher layer ll signaling (i.e., cell-specific information).

Here, according to the example of the TS 38 series, the cell-specific information may mean, for example, "TDD-UL-DL-ConfigurationCommon".

In addition, the terminal may establish an additional configuration for the cell-specifically configured flexible symbol through the UE-specific higher layer signaling.

In addition, a symbol may be dynamically configured for a flexible symbol region configured for higher layer signaling through DCI of a specific format.

The terminal may perform the wireless communication on the uplink symbol, the downlink symbol, or the flexible symbol configured in the terminal (S1420).

Here, an example of the slot format that may be configured in the terminal may be as shown in Table 1 below. The slot format at this time may correspond to, for example, a slot format in the case of a normal CP.

TABLE 1

| | Symbol number in a slot | | | | | | | | | | | | | |
|---|---|---|---|---|---|---|---|---|---|---|---|---|---|---|
| format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |

TABLE 1-continued

| format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | F | U | U | U |
| 32 | D | D | D | D | D | D | D | D | D | F | F | U | U | U |
| 33 | D | D | D | D | D | D | D | D | F | F | F | U | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | F | F | F | F | F | F | U | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | F | F | U | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | (Reserved) | | | | | | | | | | | | | |
| 255 | UE determines the slot format for the slot based on IDD-IZ-DL-ConfigurationCommon, or TDD-UL-DL-ConfigDedicated and, if any, on detected DCI formats. | | | | | | | | | | | | | |

In Table 1, D means the downlink symbol, U means the uplink symbol, and F means the flexible symbol.

For convenience of understanding, the slot format will be described with reference to Table 1 as follows. For example, in the case of slot format 0, it may mean that all of the symbols (i.e., symbols 0 to 13) existing in one slot are the downlink symbol. In addition, for example, in the case of the slot format 1, it may mean that all symbols existing in one slot are the uplink symbol. As another example, in the case of slot format 55, symbol 0, symbol 1, and symbols 8 to 13 may be the downlink symbol, symbols 2 to 4 may be the flexible symbol, and symbols 5 to 7 may be the uplink symbol.

It is necessary to consider a configuration of a resource pool for sidelinks operating in such an environment.

Basically, in the case of a resource used as a downlink in Uu interface-based communication (base station-terminal communication), performance may be very degraded due to interference when a sidelink operation is performed on the corresponding resource, and thus it is possible to perform a sidelink operation on a resource used as an uplink in the Uu interface-based communication.

However, since the sidelink communication needs to consider both an in-coverage terminal capable of communicating with the base station and an out-coverage terminal existing outside the communication area with the base station, the resource pool information needs to be shared between the in-coverage/out-coverage terminals.

At this time, in the case of the out-coverage terminal, it may be difficult to dynamically configure the resource pool, and therefore, briefly, the resource pool for sidelink may be configured for a semi-statically cell-specifically configured UL resource, and in an example of the present disclosure, the corresponding situation is assumed for the convenience of explanation.

However, the present disclosure is not limited to operations of semi-statically cell-specifically configured UL resources, and for example, a resource pool for a sidelink may be configured including a region configured as a flexible symbol.

Hereinafter, when the cell-specifically semi-statically UL resource is configured, an example of dividing the corresponding semi-static UL region into a predetermined time duration (e.g., in units of a plurality of symbols) and restructuring to configure a resource pool for a sidelink will be described with reference to the drawings.

Here, the following terminal (for example, device) may be as follows.

The device may be a (autonomous) device that communicates with at least one of a mobile terminal, a network, and an autonomous vehicle other than the apparatus.

Alternatively, the device may be a (autonomous) device that implements at least one advanced driver assistance system (ADAS) function based on a signal for controlling the movement of the device.

Alternatively, the device may be a (autonomous) device that receives an input from a user to switch a driving mode of the device from an autonomous mode to a manual mode or from a manual driving mode to an autonomous mode.

Alternatively, the device is autonomously driven based on external object information, but may be a (autonomous) device that includes at least one of the external object information includes information on the existence of an object, location information of the object, distance information between the device and the object, and relative speed information between the device and the object.

Figure 15:
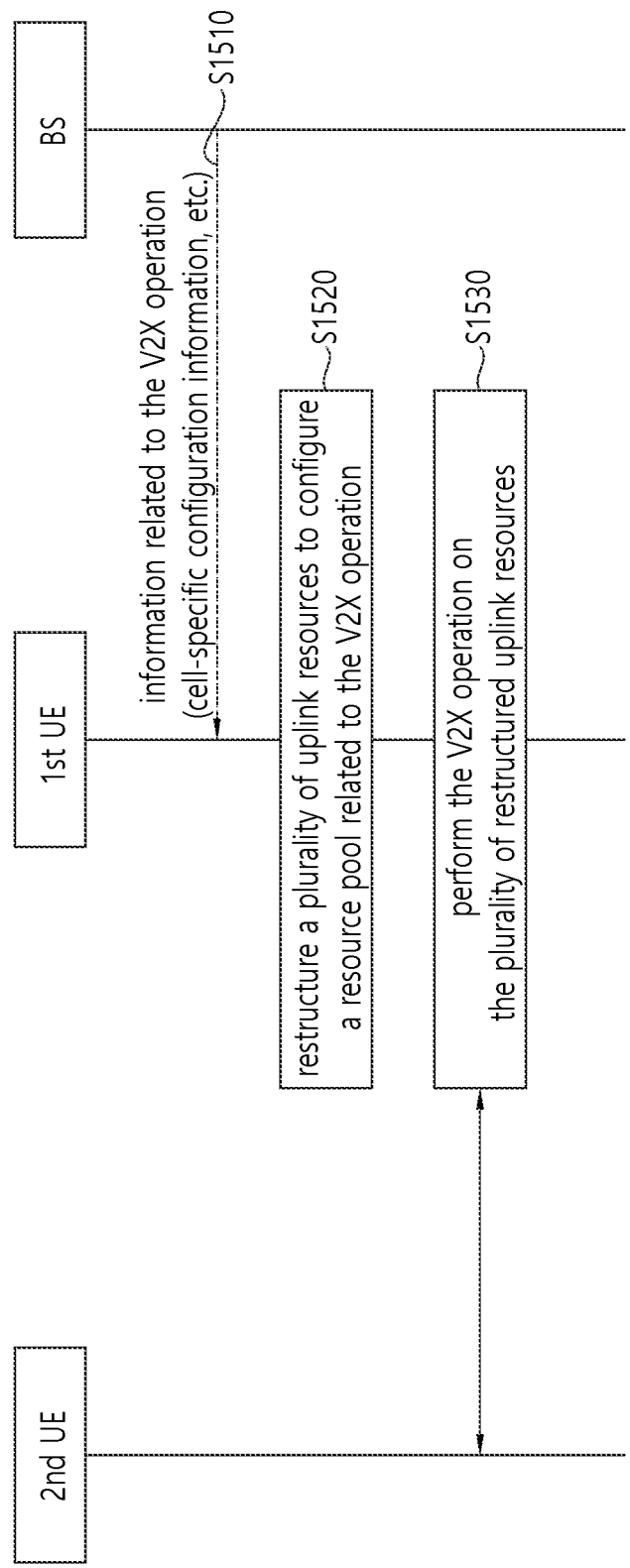
FIG. 15 is a flowchart of a resource restructuring method according to an embodiment of the present disclosure.

FIG. 15 is a flowchart of a resource restructuring method according to an embodiment of the present disclosure.

According to FIG. 15, the terminal may receive information related to the V2X operation from the base station (S1510). Here, for example, the information related to the V2X operation may correspond to the information (e.g., cell-specific configuration information, etc.) that the base station transmits to the terminal as described above.

Here, the information related to the V2X operation may be transmitted through the higher layer signaling (or physical layer signaling) of the terminal. At this time, the information related to the V2X operation may be dedicatedly signaled or broadcast. Here, for example, the higher layer signaling may be application layer signaling, L3 signaling, L2 signaling, or the like. For example, the physical layer signaling may be L1 signaling.

Meanwhile, the information related to the V2X operation does not necessarily have to be received from the base station. For example, the information related to the V2X operation may be configured in the terminal in advance.

In addition to the above-described examples, a specific example of the information related to the V2X operation will be described later for convenience of description.

On the other hand, the terminal may restructure a plurality of uplink resources to configure a resource pool related to the V2X operation (S1520).

Here, for example, the plurality of uplink resources may be restructured in a preset interval unit (e.g., time unit). In this case, the preset interval may be a basic unit for configuring the resource pool. In addition, the preset interval may be based on a symbol unit. In addition, symbols constituting the preset interval may be configured to be spaced apart from each other. In addition, when the interval of the plurality of uplink resources on which the restructuring is performed is not a multiple of the preset interval, the uplink resources remaining in the interval of the plurality of uplink resources may be excluded from the resource pool configuration. In addition, the preset interval may be defined in advance or may be set from the base station. Hereinafter, a detailed description thereof will be described later.

Figure 16:
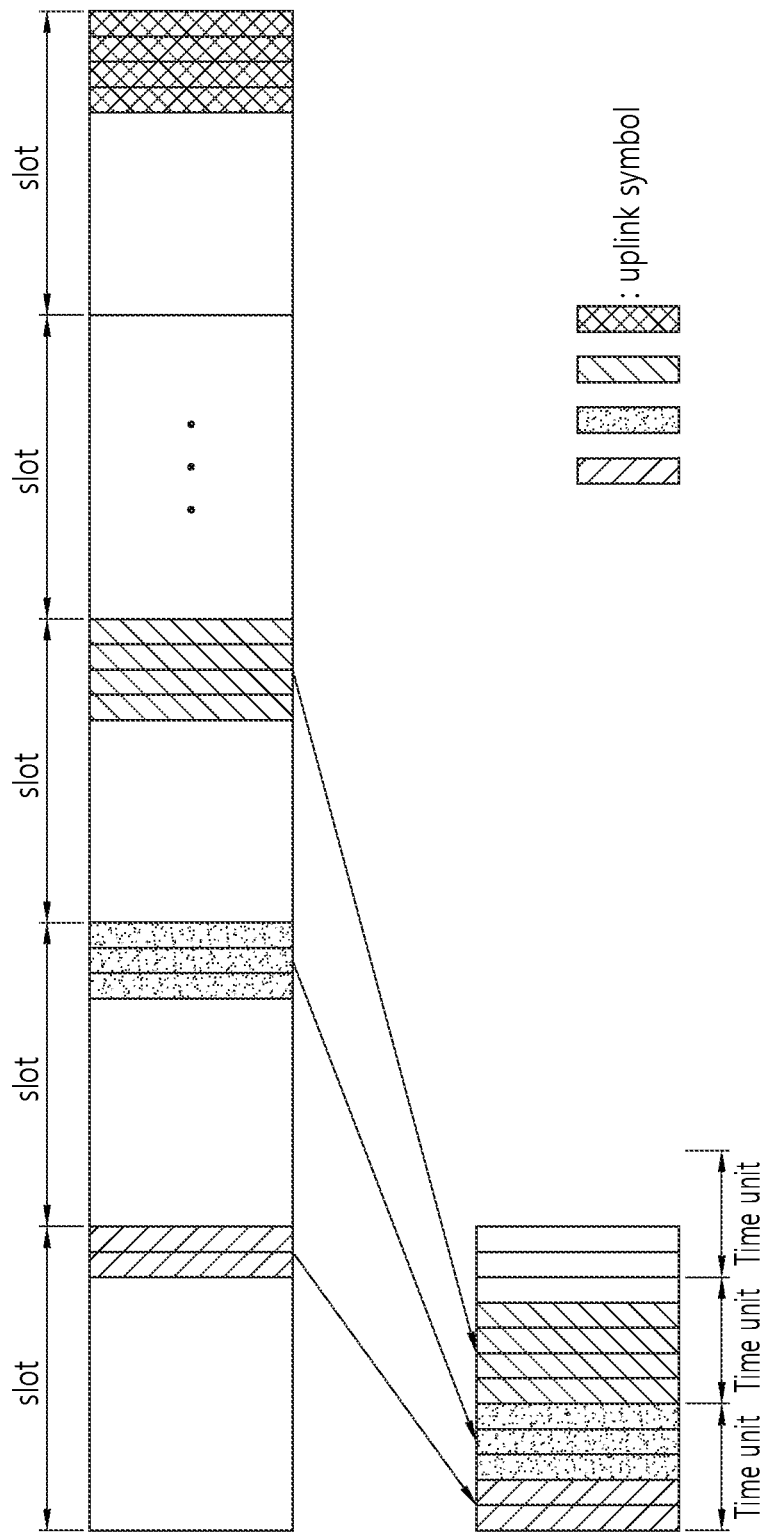
FIG. 16 schematically illustrates an example of a method for restructuring an uplink resource in a preset time unit by a terminal.

FIG. 16 schematically illustrates an example of a method for restructuring an uplink resource in a preset time unit by a terminal.

Referring to FIG. 16, each slot may include uplink symbols from each other, where each slot may include a different number of uplink symbols. However, in this drawing, for convenience of description, an example in which different numbers of uplink symbols are included in each slot is illustrated, but the fact that the same number of uplink symbols is included in each slot is also illustrated in the present disclosure. In addition to this, in some slots, the uplink symbols may not be included at all.

Here, the terminal may restructure the uplink resources included in each slot in a certain number unit (e.g., in a time unit in FIG. 16) in order to configure the resource pool for the V2X operation (e.g., sidelink operation).

In the example of FIG. 16, when two uplink symbols are included in a first slot, three uplink symbols are included in a second slot, and four uplink symbols are included in a third slot, the uplink symbols included in each slot may be restructured in units of five symbols (i.e., a time unit in FIG. 16).

Here, the fact that the terminal restructures the uplink resources included in each slot in units of a certain number may mean that the uplink resources are restructured from a logical point of view.

Returning back to FIG. 15, in other words, by dividing the semi-static UL resource configured in the Uu interface in a time unit of a predetermined length, it may be newly defined as a basic unit for configuring a resource pool for a sidelink.

This operation may be performed in units of all UL resources configured to be spaced apart from each other within an interval in which the semi-static configuration is valid, or may be performed in units of regions composed of consecutive symbols. According to the semi-statically configured semi-statically resource configuration for the Uu interface, the time unit having the predetermined length may be configured over several slots or may be configured to be limited within the slot unit.

At this time, the length of the time unit may be defined in advance in the system, or may be previously (pre)set through the higher layer signaling and/or physical layer signaling from the base station to the terminal, and may be defined as the shortest length in a region unit composed of consecutive symbols in the semi-static UL resource configuration or the symbol length of a block in which a synchronization signal transmitted for a sidelink is transmitted.

The granularity of the length of the time unit may be configured in units of slots or symbols. In addition, when the interval in which the restructuring is performed does not fit perfectly in a multiple of the time unit determined by the above method, the region remaining within the interval may occur, and this region may be excluded from the resource pool configuration target.

In order to protect the PUCCH transmission for the Uu interface (for example, PUCCH composed of short symbols), some symbols of the region in which the restructuring is performed may be configured to be excluded from the resource pool configuration target for the sidelink in advance.

The corresponding configuration may be defined in advance in the system or may be (pre)configured in the terminal through higher layer signaling and/or physical layer signaling by the base station.

At this time, the base station may configure a resource that is a target of sidelink resource pool configuration as symbol granularity. For example, the base station may inform a symbol in which a resource targeted for the sidelink resource pool configuration within the cell-specifically configured semi-statically UL resource starts and the length of the corresponding interval. The restructuring operation related to the time unit may be applied within the corresponding region.

The symbols constituting the time unit may be configured to be spaced apart from each other.

More generally, a plurality of symbols constituting a time unit may be divided into a plurality of groups and configured to be spaced apart from each other in time. (For example, this may occur according to the resource configuration of the Uu interface.)

At this time, there may be a limit on the number of spaced symbol groups constituting one time unit and/or the length of the interval in which the plurality of symbol groups are configured. For example, the number of symbol groups and the length of the interval may be determined in consideration of the channel coherence time according to the transmission configuration of the RS, and may be defined in advance in the system or may be (pre) configured through higher layer signaling and/or physical layer signaling in the terminal by the base station.

In addition, when the plurality of symbol groups spaced apart from each other in time are configured, there may be a limit on the minimum number of symbols required to configure a symbol group unit. For example, this may be determined according to the transmission configuration of RS, and may be defined in the system in advance or may be (pre)configured in the terminal through the higher layer signaling and/or the physical layer signaling by the base station.

A symbol group that does not satisfy the number of symbols may be excluded from the configuration of the symbol group constituting the time unit, and the symbol group may be excluded from the resource pool configuration target. As another example, when the time unit is not configured within the interval length limit for a plurality of symbol groups constituting a single time unit, among the plurality of symbol groups constituting a time unit, in consideration of latency, the symbol group at the earliest point among the plurality of symbol groups that may constitute a time unit may be first excluded from the time unit configuration and the corresponding symbol group may be excluded from the resource pool configuration target.

Meanwhile, in addition to the above method, the resource pool for the sidelink may be configured in the time unit having different lengths.

For example, the plurality of uplink resources may be restructured in units of intervals configured to have different lengths. Hereinafter, a detailed description thereof will be described later.

When configuring the semi-static UL resource, the length of the UL region composed of consecutive symbols may be set differently, and these units may be used as units constituting the resource pool as they are.

For example, the semi-statically UL resources may be configured in a slot unit for each slot, and in this case, the lengths of the semi-statically UL resources may be configured differently for each slot. In this case, the configuration unit of the frequency axis resource may be differently configured according to the length of the unit. For example, the size of the subchannel may be configured differently, and thus, the size in one 'time×frequency' domain unit may be configured to be the same or to be very similar between the semi-statically UL regions with different lengths.

In addition, when the interval lengths are set differently, a resource pool may be configured only in units in which the length of the interval is greater than or equal to a certain length.

After the resource for configuring the resource pool is determined, the base station may configure the resource pool used for the sidelink to the terminal through a bitmap.

In the case of the LTE system, the base station is operated so that the bitmap of the set specific length is repeatedly applied within a preset interval. At this time, in the case of a downlink subframe, a special subframe, and a subframe in which SLSS is transmitted within a preset interval, the subframe is excluded from the resource for the resource pool configuration, and the reserved subframe is calculated in consideration of the length of the configured bitmap, and thus the subframe is also excluded from the resource for the resource pool configuration.

Here, since the reserved subframe is a resource that is excluded in consideration of the repetitive application operation of the bitmap, even though the transmission may be actually performed in the corresponding resource, there is a need to consider the operation of preventing such reserved subframe from occurring.

Meanwhile, as described above, the sidelink may be performed on the semi-static UL resource configured to be cell-specific in the Uu interface.

Assuming the situation in which the transmission is performed in units of slots such as NR, the slot in which the SLSS is transmitted among the slots (alternatively, a slot including a symbol configured as a cell-specifically configured semi-statically UL) configured as cell-specifically configured semi-statically UL may be excluded from the resource that is the target of the resource pool configuration.

In addition, the bitmap may be configured for a UL resource (e.g., a slot) within an interval corresponding to a period in which the cell-specifically configured semi-statically resource configuration is transmitted or a multiple of the corresponding period.

In this case, the 'interval corresponding to the multiple of the corresponding period' may correspond to a factor of the length of the interval in which the bitmap is repeatedly applied.

In this case, in order to prevent the slot from reserved, the size of the bitmap may be considered when determining a period in which the SLSS is transmitted within the interval in which the bitmap is repeatedly applied. For example, the SLSS transmission may be configured to have a period corresponding to the number of times corresponding to the multiple of the size of the bitmap within a section in which the bitmap is repeatedly applied.

For example, in the case of the NR, a cell-specifically configured semi-statically resource is configured in a 20 ms period. In this case, the bitmap for the slot corresponding to the UL region among the cell-specifically semi-statically resources may be configured, for example, in units of slots.

For example, when the number of slots corresponding to the UL region among the cell-specifically semi-statically resources configured within 20 ms is 11, the slots may be configured of 11 bits.

In addition, when the length of the interval in which the corresponding bitmap is repeatedly applied is set to 10240 ms, the number of times SLSS is transmitted within the interval may correspond to a multiple of 11 and the size of the bitmap, and the SLSS transmission period of the SLSS is determined as a value corresponding to the corresponding interval and the corresponding number of times of transmission.

As another method, a period of a resource in which a synchronization (sync.) signal is transmitted within an SFN period corresponding to 10240 ms may be configured as a multiple of a period in which a semi-specifically configured semi-statically resource configuration is transmitted.

The period of the resource through which the synchronization signal is transmitted may be defined in advance in the system according to the above principle, or may be (pre) configured in the terminal through higher layer signaling and/or physical layer signaling by the base station.

In this case, the size of the bitmap may be set for the interval corresponding to the period of the resource in which the synchronization signal is transmitted.

In addition, when the bitmap also includes the resource in which the synchronization signal is transmitted to the configured resource pool, the corresponding resource is configured as the resource pool, and the data transmission timing overlaps with the corresponding resource, the corresponding transmission may drop, and when the synchronization signal is transmitted to some of the corresponding resources, data may be punctured or rate-matched to be transmitted to the rest region (which may mean only time-axis resources not used for the transmission of the synchronization signal, or may mean both time-axis and frequency-axis resources not used for the transmission of the synchronization signal).

Thereafter, the terminal may perform the V2X operation on the plurality of restructured uplink resources (S1530). A specific example in which the terminal performs the V2X operation on the restructured uplink resource is the same as described above, so a repetitive description of redundant contents will be omitted for convenience of description.

The contents of FIG. 15 may be described as follows from the viewpoint of the terminal.

Figure 17:
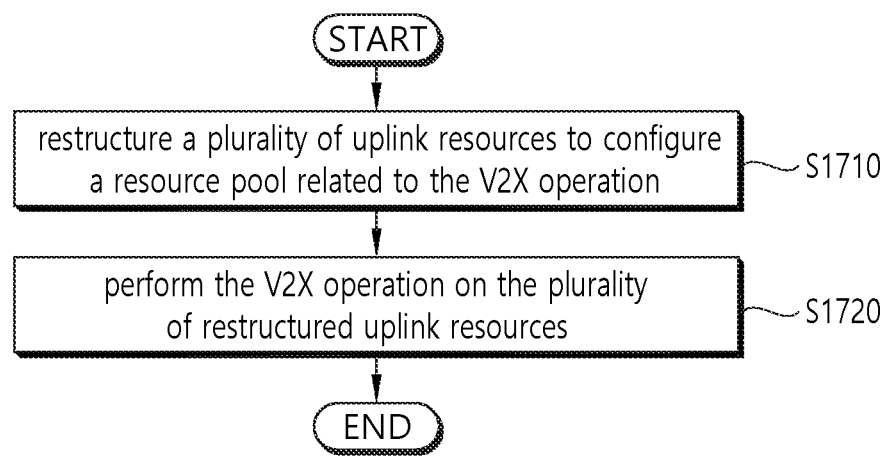
FIG. 17 is a flowchart of a resource restructuring method from a terminal perspective according to an embodiment of the present disclosure.

FIG. 17 is a flowchart of a resource restructuring method from a terminal perspective according to an embodiment of the present disclosure.

Referring to FIG. 17, the terminal may restructure a plurality of uplink resources to configure a resource pool related to the V2X operation (S1710). Here, since a specific example in which the terminal restructures a plurality of uplink resources is the same as described above, a description of redundant contents will be omitted for convenience of description.

Thereafter, the terminal may perform the V2X operation on the plurality of restructured uplink resources (S1720). Here, since a specific example in which the terminal performs the V2X operation on the plurality of uplink resources is the same as described above, a description of redundant contents will be omitted for convenience of description.

Figure 18:
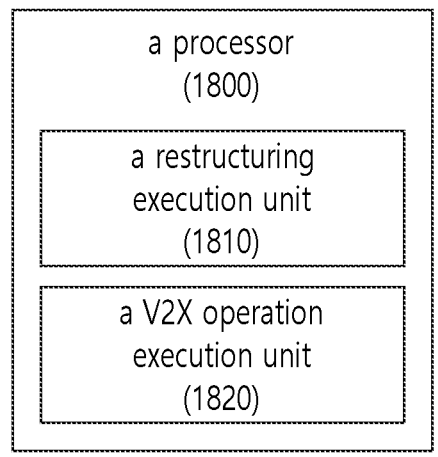
FIG. 18 is a block diagram of an example of a resource restructuring apparatus from a terminal perspective according to an embodiment of the present disclosure.

FIG. 18 is a block diagram of an example of a resource restructuring apparatus from a terminal perspective according to an embodiment of the present disclosure.

Referring to FIG. 18, a processor 1800 may include a restructuring execution unit 1810 and a V2X operation execution unit 1820. In this case, the processor 1800 may also mean the processor in FIGS. 21 to 17.

The restructuring execution unit 1810 may be configured to restructure a plurality of uplink resources in order to configure the resource pool related to the V2X operation. Here, since a specific example in which the terminal restructures a plurality of uplink resources is the same as described above, a description of redundant contents will be omitted for convenience of description.

The V2X operation execution unit 1820 may be configured to perform the V2X operation on the plurality of restructured uplink resources. Here, since a specific example in which the terminal performs the V2X operation on the plurality of uplink resources is the same as described above, a description of redundant contents will be omitted for convenience of description.

The contents of FIG. 15 may be described as follows from the viewpoint of the base station.

Figure 19:
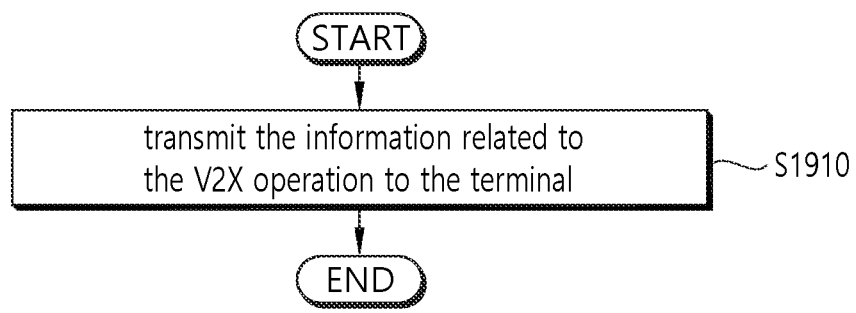
FIG. 19 is a flowchart of a method for transmitting information related to a V2X operation from the viewpoint of the base station according to an embodiment of the present disclosure.

FIG. 19 is a flowchart of a method for transmitting information related to a V2X operation from the viewpoint of the base station according to an embodiment of the present disclosure.

Referring to FIG. 19, the base station may transmit the information related to the V2X operation to the terminal (1910). Here, the information related to the V2X operation may be information related to restructuring the plurality of uplink resources to configure the resource pool related to the V2X operation. Since a specific example of the information related to the V2X operation is the same as described above, a description of redundant contents will be omitted for convenience of description.

Figure 20:
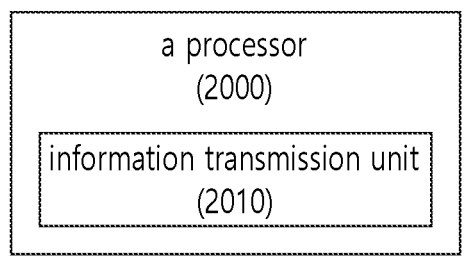
FIG. 20 is an example of a block diagram of an apparatus for transmitting information related to a V2X operation from the viewpoint of the base station according to an embodiment of the present disclosure.

FIG. 20 is an example of a block diagram of an apparatus for transmitting information related to a V2X operation from the viewpoint of the base station according to an embodiment of the present disclosure.

According to FIG. 20, a processor 2000 may be configured to transmit the information related to the V2X operation to the terminal. Here, the information related to the V2X operation may be information related to restructuring the plurality of uplink resources to configure the resource pool related to the V2X operation. Since a specific example of the information related to the V2X operation is the same as described above, a description of redundant contents will be omitted for convenience of description.

Although not limited thereto, various suggestions of the present disclosure described above may be applied to various fields requiring wireless communication/connection (e.g., 5G) between devices.

Hereinafter, it will be illustrated in more detail with reference to the drawings. In the following drawings/description, the same reference numerals may exemplify the same or corresponding hardware block, software block, or functional block, unless otherwise indicated.

Figure 21:
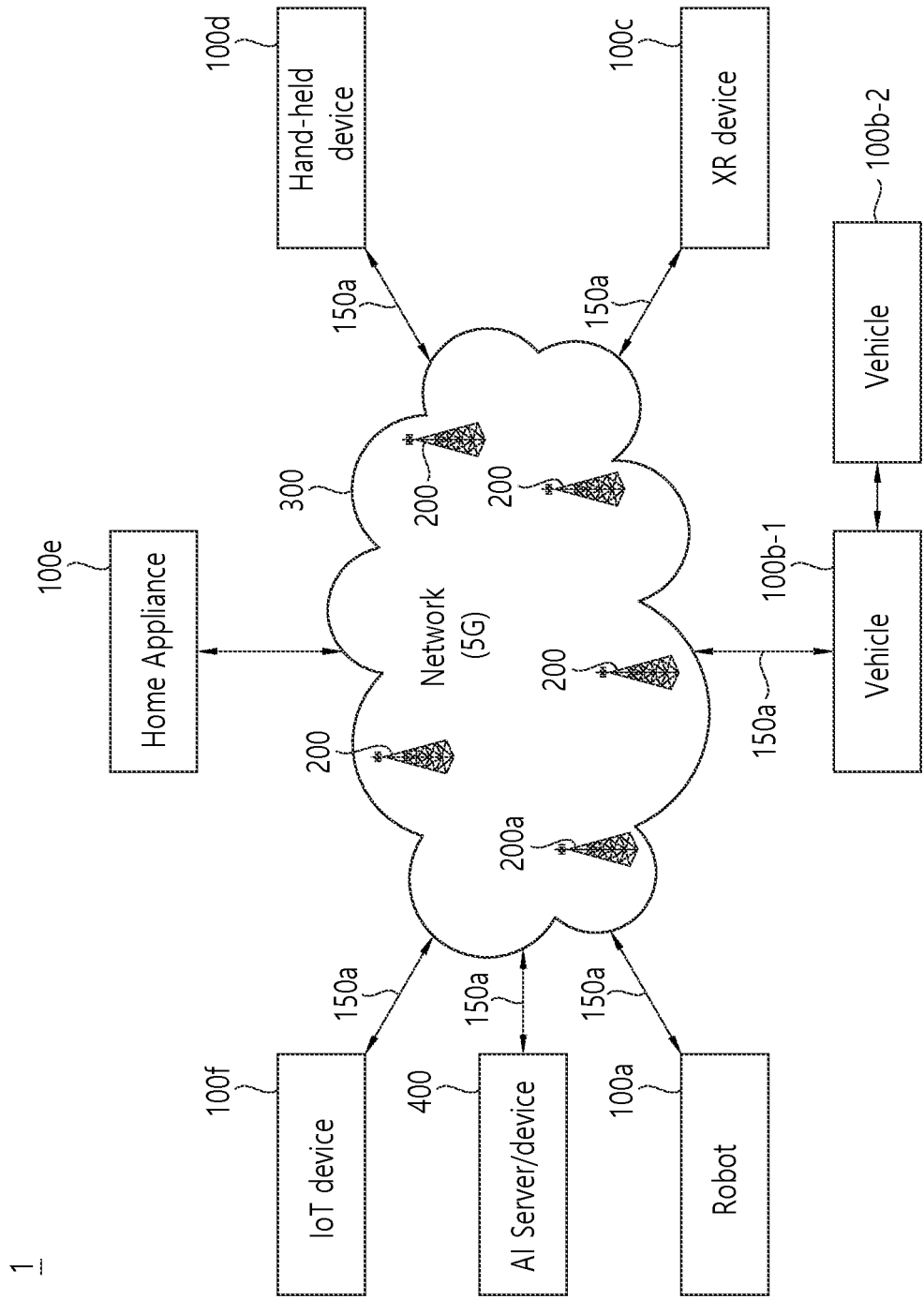
FIG. 21 illustrates a communication system 1 applied to the present disclosure.

FIG. 21 illustrates a communication system 1 applied to the present disclosure.

Referring to FIG. 21, a communication system 1 applied to the present disclosure includes a wireless device, a base station, and a network. Here, the wireless device refers to a device that performs communication using a wireless access technology (e.g., 5G new RAT (NR) or long term evolution (LTE) and may be referred to as a communication/wireless/ 5G device. Although not limited thereto, the wireless devices may include a robot 100*a*, vehicles 100*b*-1 and 100*b*-2, an extended reality (XR) device 100*c*, a hand-held device 100*d*, a home appliance 100*e*, an Internet of things (IoT) device 100*f*, and an AI device/server 400. For example, the vehicle may include a vehicle equipped with a wireless communication function, an autonomous vehicle, a vehicle capable of performing inter-vehicle communication, and the like. Here, the vehicle may include an unmanned aerial vehicle (UAV) (e.g., a drone). The XR device may include augmented reality (AR)/virtual reality (VR)/mixed reality (MR) devices and may be implemented in the form of a head-mounted device (HMD), a head-up display (HUD)

TV provided in a vehicle, a smartphone, a computer, a wearable device, a home appliance, a digital signage, a vehicle, a robot, and the like. Portable devices may include a smartphone, a smart pad, a wearable device (e.g., smart watch, smart glasses), a computer (e.g., notebook computer), etc. Home appliances may include a TV, a refrigerator, and a washing machine. IoT devices may include a sensor, a smart meter, and the like. For example, the base station and the network may be implemented as a wireless device, and a specific wireless device 200a may operate as a base station/network node for other wireless devices.

The wireless devices 100a to 100f may be connected to a network 300 through a base station 200. An artificial intelligence (AR) technology may be applied to the wireless devices 100a to 100f, and the wireless devices 100a to 100f may be connected to the AI server 400 through the network 300. The network 300 may be configured using a 3G network, a 4G (e.g., LTE) network, or a 5G (e.g., NR) network. The wireless devices 100a to 100f may communicate with each other through the base station 200/network 300 but may communicate directly (e.g. sidelink communication) without passing through the base station/network. For example, the vehicles 100b-1 and 100b-2 may perform direct communication (e.g. V2V (vehicle to vehicle)/V2X (vehicle to everything) communication). In addition, an IoT device (e.g., sensor) may directly communicate with other IoT devices (e.g., sensors) or other wireless devices 100a to 100f.

Wireless communication/connections 150a and 150b may be established between the wireless devices 100a to 100f/base station 200 and the base station 200/wireless devices 100a to 100f. Here, wireless communication/connection may be performed through various wireless access technologies (e.g., 5G NR) for uplink/downlink communication 150a and sidelink communication 150b (or D2D communication). Through the wireless communication/connection 150a and 150b, the wireless device and the base station/wireless device may transmit/receive wireless signals to each other. For example, the wireless communication/connections 150a and 150b may transmit/receive signals through various physical channels based on the entire/partial process of FIG. A1. To this end, based on various suggestions of the present disclosure, at least some of various configuration information configuring processes for transmission/reception of wireless signals, various signal processing processes (e.g., channel encoding/decoding, modulation/demodulation, resource mapping/demapping, etc.), and a resource allocation process, etc. may be performed.

Figure 22:
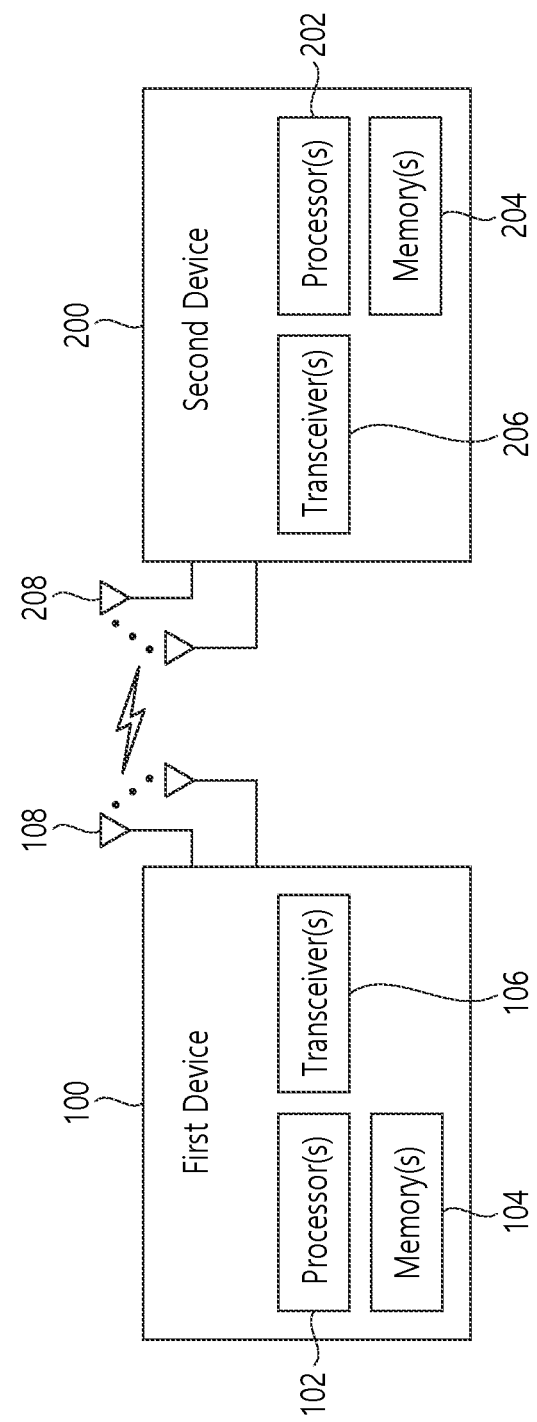
FIG. 22 illustrates a wireless device applicable to the present disclosure.

FIG. 22 illustrates a wireless device applicable to the present disclosure.

Referring to FIG. 22, a first device 100 and a second device 200 may transmit and receive wireless signals through various wireless access technologies (e.g., LTE and NR). Here, {the first device 100, the second device 200} may correspond to {wireless device 100x, base station 200} and/or {wireless device 100x, wireless device 100x) of FIG. 21}.

The first device 100 may include one or more processors 102 and one or more memories 104 and may further include one or more transceivers 106 and/or one or more antennas 108. The processor 102 may be configured to control the memory 104 and/or the transceiver 106 and may be configured to implement the functions, procedures, and/or methods described/suggested above. For example, the processor 102 may process information in the memory 104 to generate first information/signal and then transmit a wireless signal including the first information/signal through the transceiver 106. In addition, the processor 102 may receive a wireless signal including second information/signal through the transceiver 106 and then store information obtained from signal processing of the second information/signal in the memory 104. The memory 104 may be connected to the processor 102 and may store various information related to the operation of the processor 102. For example, the memory 104 may store software code including instructions for performing some or all of the processes controlled by the processor 102 or performing the previously described/suggested procedures and/or methods. Here, the processor 102 and the memory 104 may be part of a communication modem/circuit/chip designed to implement wireless communication technology (e.g., LTE, NR). The transceiver 106 may be connected with the processor 102 and may transmit and/or receive wireless signals through one or more antennas 108. The transceiver 106 may include a transmitter and/or a receiver. The transceiver 106 may be used with a radio frequency (RF) unit. In the present disclosure, the wireless device may refer to a communication modem/circuit/chip.

The second device 200 may include one or more processors 202 and one or more memories 204 and may further include one or more transceivers 206 and/or one or more antennas 208. The processor 202 may be configured to control the memory 204 and/or the transceiver 206 and may be configured to implement the functions, procedures, and/or methods described/suggested above. For example, the processor 202 may process information in the memory 204 to generate first information/signal and then transmit a wireless signal including the first information/signal through the transceiver 206. In addition, the processor 202 may receive a wireless signal including second information/signal through the transceiver 206 and then store information obtained from signal processing of the second information/signal in the memory 204. The memory 204 may be connected to the processor 202 and may store various information related to the operation of the processor 202. For example, the memory 204 may store software code including instructions for performing some or all of the processes controlled by the processor 202 or performing the previously described/suggested procedures and/or methods. Here, the processor 202 and the memory 204 may be part of a communication modem/circuit/chip designed to implement wireless communication technology (e.g., LTE, NR). The transceiver 206 may be connected with the processor 202 and may transmit and/or receive wireless signals through one or more antennas 208. The transceiver 206 may include a transmitter and/or a receiver. The transceiver 206 may be used with a radio frequency (RF) unit. In the present disclosure, the wireless device may refer to a communication modem/circuit/chip.

Hereinafter, hardware elements of the wireless devices 100 and 200 will be described in more detail. Although not limited thereto, one or more protocol layers may be implemented by one or more processors 102, 202. For example, one or more processors 102, 202 may implement one or more layers (e.g., functional layers such as PHY, MAC, RLC, PDCP, RRC, and SDAP). One or more processors 102 and 202 may generate one or more protocol data units (PDUs) and/or one or more service data units (SDUs) according to the functions, procedures, suggestions, and/or methods disclosed in this document. One or more processors 102 and 202 may generate messages, control information, data, or information according to the functions, procedures, suggestions and/or methods disclosed herein. One or more processors 102 and 202 may generate a signal (e.g., baseband signal) containing a PDU, an SDU, a message, control information, data or information according to the functions, procedures, suggestions and/or methods disclosed herein and provide the same to one or more transceivers 106 and 206. One or more processors 102 and 202 may receive signals (e.g., baseband signals) from one or more transceivers 106 and 206 and obtain an PDU, a SDU, a message, control information, data or information according to the functions, procedures, suggestions and/or methods disclosed herein.

The one or more processors 102 and 202 may be referred to as a controller, a microcontroller, a microprocessor, or a microcomputer. One or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in one or more processors 102 and 202. The functions, procedures, suggestions and/or methods disclosed in this document may be implemented using firmware or software, and firmware or software may be implemented to include modules, procedures, functions, and the like. Firmware or software configured to perform the functions, procedures, suggestions and/or methods disclosed in this document may be included in one or more processors 102 and 202, may be stored in one or more memories 104 and 204, and may be driven by one or more processors 102 and 202. The functions, procedures, suggestions and or methods disclosed in this document may be implemented using firmware or software in the form of codes, instructions and/or a set of instructions.

One or more memories 104, 204 may be connected to one or more processors 102 and 202 and may store various types of data, signals, messages, information, programs, codes, instructions, and/or commends. One or more memories 104 and 204 may include ROM, RAM, EPROM, flash memory, hard drive, registers, cache memory, computer readable storage medium, and/or combinations thereof. One or more memories 104 and 204 may be located inside and/or outside one or more processors 102 and 202. In addition, one or more memories 104 and 204 may be connected to one or more processors 102, 202 through various technologies such as wired or wireless connection.

The one or more transceivers 106 and 206 may transmit user data, control information, wireless signals/channels, and the like mentioned in the methods and/or operation flowcharts of this document to one or more other devices. The one or more transceivers 106 and 206 may receive user data, control information, wireless signals/channels, and the like mentioned in the functions, procedures, suggestions, methods and/or operational flowcharts, etc. disclosed herein from one or more other devices. For example, one or more transceivers 106 and 206 may be connected to one or more processors 102 and 202 and may transmit and receive wireless signals. For example, one or more processors 102 and 202 may control one or more transceivers 106 and 206 to transmit user data, control information, or wireless signals to one or more other devices. In addition, one or more processors 102 and 202 may control one or more transceivers 106 and 206 to receive user data, control information, or wireless signals from one or more other devices. In addition, one or more transceivers 106 and 206 may be connected to one or more antennas 108 and 208, and one or more transceivers 106 and 206 may be configured to transmit and receive user data, control information, wireless signals/channels, etc. mentioned in the functions, procedures, suggestions, methods and/or operational flowcharts disclosed in this document. In this document, one or more antennas may be a plurality of physical antennas or a plurality of logical antennas (e.g., antenna ports). One or more transceivers 106 and 206 may convert received wireless signal/channel from an RF band signal into a baseband signal in order to process received user data, control information, wireless signals/channels, etc. using one or more processors 102 and 202. One or more transceivers 106 and 206 may convert user data, control information, wireless signals/channels, etc. processed using one or more processors 102 and 202 from a baseband signal to an RF band signal. To this end, one or more of the transceivers 106 and 206 may include (analog) oscillators and/or filters.

Figure 23:
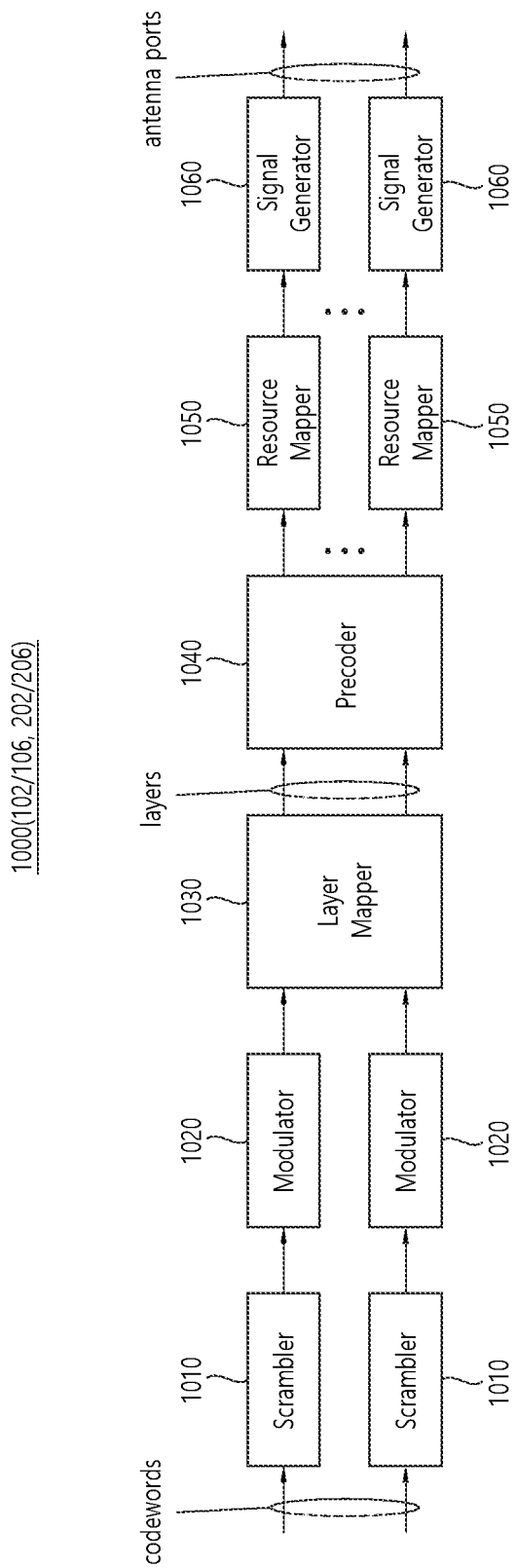
FIG. 23 illustrates a signal processing circuit for a transmission signal.

FIG. 23 illustrates a signal processing circuit for a transmission signal.

Referring to FIG. 23, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 23 may be performed in the processors 102 and 202 and/or the transceivers 106 and 206 of FIG. 22. The hardware elements of FIG. 23 may be implemented in the processors 102 and 202 and/or the transceivers 106 and 206 of FIG. 22. For example, blocks 1010 to 1060 may be implemented in the processors 102 and 202 of FIG. 22. Also, blocks 1010 to 1050 may be implemented in the processors 102 and 202 of FIG. 22, and block 1060 may be implemented in the transceivers 106 and 206 of FIG. 22.

A codeword may be converted into a wireless signal through the signal processing circuit 1000 of FIG. 23. Here, the codeword is an encoded bit sequence of an information block. The information block may include a transport block (e.g., a UL-SCH transport block, a DL-SCH transport block). The wireless signal may be transmitted through various physical channels (e.g., PUSCH and PDSCH) of FIG. A1.

Specifically, the codeword may be converted into a scrambled bit sequence by the scrambler 1010. The scramble sequence used for scramble may be generated based on an initialization value, and the initialization value may include ID information of a wireless device. The scrambled bit sequence may be modulated by the modulator 1020 into a modulation symbol sequence. The modulation scheme may include pi/2-binary phase shift keying (pi/2-BPSK), m-phase shift keying (m-PSK), m-quadrature amplitude modulation (m-QAM), and the like. The complex modulation symbol sequence may be mapped to one or more transport layers by the layer mapper 1030. Modulation symbols of each transport layer may be mapped to corresponding antenna port(s) by the precoder 1040 (precoding). An output z of the precoder 1040 may be obtained by multiplying an output y of the layer mapper 1030 by an N*M precoding matrix W. Here, N is the number of antenna ports, and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to a time-frequency resource. The time-frequency resource may include a plurality of symbols (e.g., CP-OFDMA symbols, DFT-s-OFDMA symbols) in a time domain and may include a plurality of subcarriers in a frequency domain. The signal generator 1060 may generate a wireless signal from the mapped modulation symbols, and the generated wireless signal may be transmitted to another device through each antenna. To this end, the signal generator 1060 may include an Inverse fast Fourier transform (IFFT) module and a cyclic prefix (CP) inserter, a digital-to-analog converter (DAC), a frequency uplink converter, and the like.

A signal processing process for a received signal in the wireless device may be configured as the reverse of the signal processing process 1010 to 1060 of FIG. 23. For example, the wireless device (e.g., 100 or 200 in FIG. 22) may receive a wireless signal from the outside through an antenna port/transceiver. The received wireless signal may be converted into a baseband signal through a signal restorer. To this end, the signal restorer may include a frequency downlink converter, an analog-to-digital converter (ADC), a CP canceller, and a fast Fourier transform (FFT) module. Thereafter, the baseband signal may be reconstructed into a codeword through a resource de-mapper process, a postcoding process, a demodulation process, and a descramble process. The codeword may be restored to an original information block through decoding. Accordingly, a signal processing circuit (not shown) for a reception signal may include a signal restorer, a resource demapper, a postcoder, a demodulator, a descrambler, and a decoder.

Figure 24:
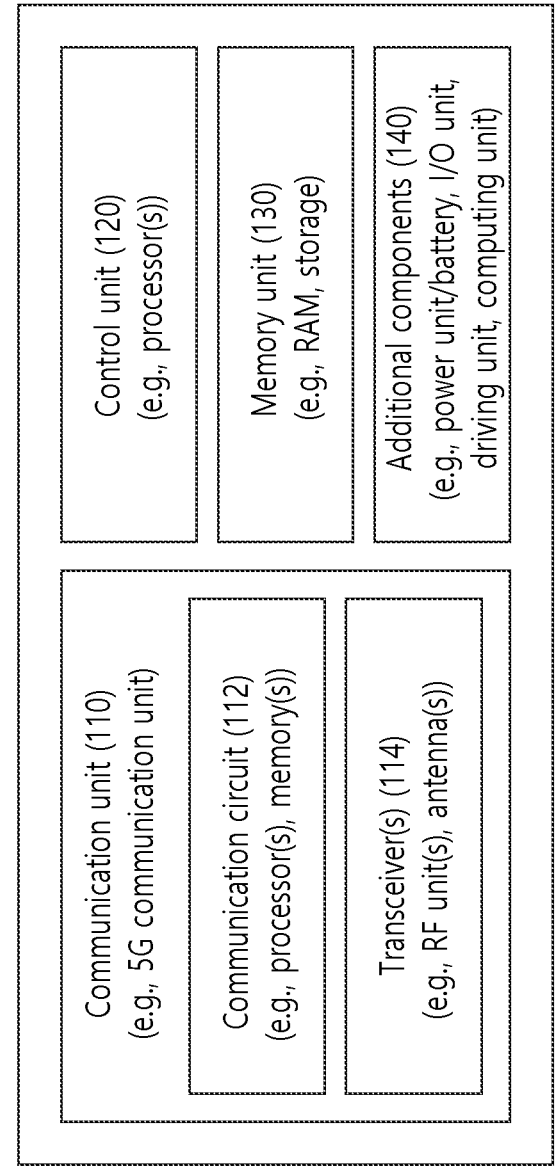
FIG. 24 shows another example of a wireless device applied to the present disclosure.

FIG. 24 shows another example of a wireless device applied to the present disclosure. The wireless devices may be implemented in various forms according to use-examples/services (see FIGS. 21 and 25 to 30).

Referring to FIG. 24, the wireless devices 100 and 200 correspond to the wireless devices 100 and 200 of FIG. 22 and may include various elements, components, units/units, and/or modules. For example, the wireless devices 100 and 200 may include a communication unit 110, a control unit 120, a memory unit 130, and an additional component 140. The communication unit may include a communication circuit 112 and a transceiver(s) 114. For example, communication circuit 112 may include one or more processors 102 and 202 and/or one or more memories 104 and 204 of FIG. 22. For example, the transceiver(s) 114 may include one or more transceivers 106 and 206 and/or one or more antennas 108 and 208 of FIG. 22. The control unit 120 may be electrically connected to the communication unit 110, the memory unit 130, and the additional component 140 and control general operations of the wireless device. For example, the control unit 120 may control the electrical/mechanical operation of the wireless device based on the program/code/command/information stored in the memory unit 130. In addition, the control unit 120 may transmit the information stored in the memory unit 130 to the outside (e.g., other communication device) via the communication unit 110 through a wireless/wired interface or store information received from the outside (e.g., other communication device) via the communication unit 110 through a wireless/wired interface in the memory unit 130.

The additional component 140 may be variously configured according to the type of wireless device. For example, the additional component 140 may include at least one of a power unit/battery, an I/O unit, a driving unit, and a computing unit. Although not limited thereto, the wireless device may be implemented in the form of the robot (FIGS. 21, 100a), the vehicles (FIGS. 21, 100b-1, 100b-2), the XR device (FIGS. 21, 100c), the portable device (FIGS. 21, 100d), the home appliance (100e of FIG. 21), the IoT device (100f of FIG. 21), a digital broadcasting terminal, a hologram device, a public safety device, an MTC device, a medical device, a fintech device (or financial device), a security device, a climate/environment device, an AI server/device (400 of FIG. 21), a base station (200 of FIG. 21), and a network node. The wireless device may be a mobile device or may be used in a fixed place depending on the use-example/service.

In FIG. 24, the various elements, components, units/units, and/or modules in the wireless devices 100 and 200 may all be interconnected through a wired interface, or at least some of them may be wirelessly connected through the communication unit 110. For example, in the wireless devices 100 and 200, the control unit 120 and the communication unit 110 may be connected by wire, and the control unit 120 and the first units (e.g., 130 and 140) may be connected wirelessly through the communication unit 110. In addition, each element, component, unit/unit, and/or module in the wireless devices 100 and 200 may further include one or more elements. For example, the control unit 120 may be configured as one or more processor sets. For example, the control unit 120 may include a set of a communication control processor, an application processor, an electronic control unit (ECU), a graphic processing processor, and a memory control processor. As another example, the memory unit 130 may include a random access memory (RAM), a dynamic RAM (DRAM), a read only memory (ROM), a flash memory, a volatile memory, and a non-volatile memory, and/or a combination thereof.

Hereinafter, an implementation example of FIG. 24 will be described in more detail with reference to the drawings.

Figure 25:
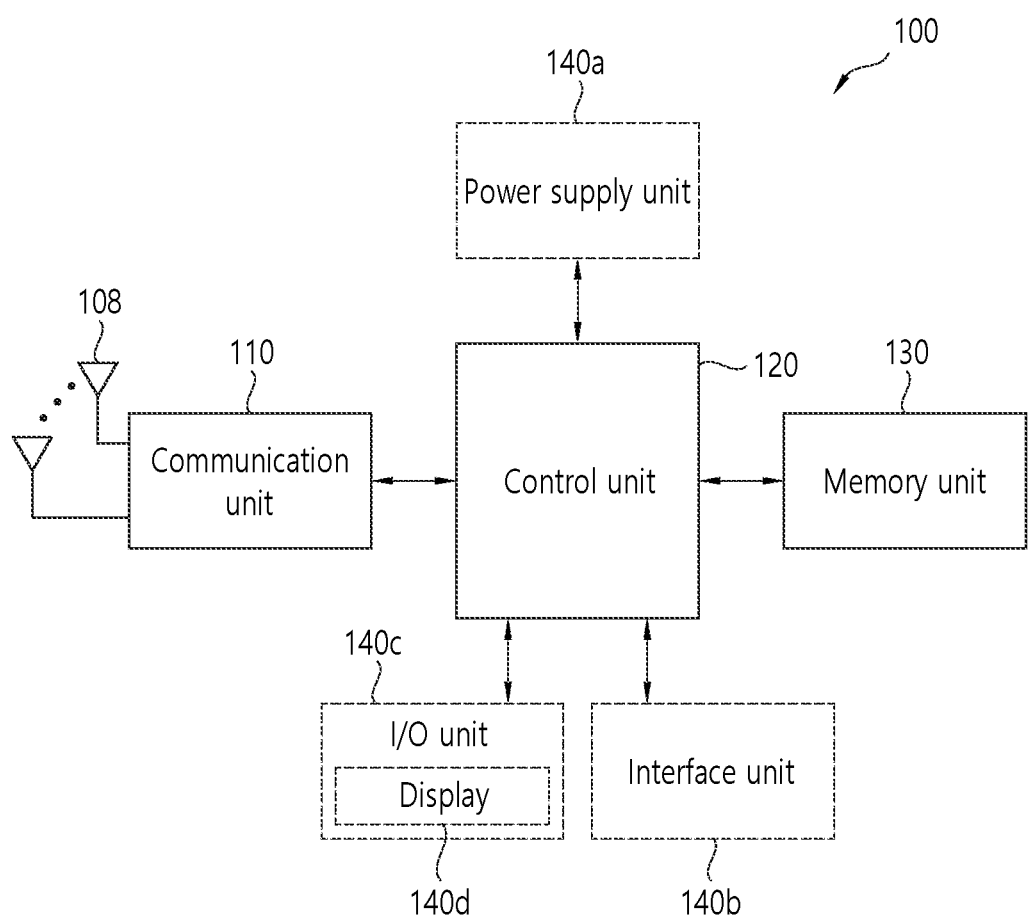
FIG. 25 illustrates a portable device applied to the present disclosure.

FIG. 25 illustrates a portable device applied to the present disclosure. The portable device may include smart phones, smart pads, wearable devices (e.g., smart watches, smart glasses), and portable computers (e.g., notebook computers). The portable device may be referred to as a mobile station (MS), a user terminal (UT), a mobile subscriber station (MSS), a subscriber station (SS), an advanced mobile station (AMS), or a wireless terminal (WT).

Referring to FIG. 25, the portable device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to blocks 110 to 130/140 of FIG. 24, respectively.

The communication unit 110 may transmit and receive signals (e.g., data, control signals, etc.) with other wireless devices and base stations. The control unit 120 may perform various operations by controlling components of the portable device 100. The control unit 120 may include an application processor (AP). The memory unit 130 may store data/parameters/programs/codes/commands required for driving the portable device 100. Also, the memory unit 130 may store input/output data/information, and the like. The power supply unit 140a may supply power to the portable device 100 and may include a wired/wireless charging circuit, a battery, and the like. The interface unit 140b may support connection between the portable device 100 and other external devices. The interface unit 140b may include various ports (e.g., audio input/output ports, video input/output ports) for connection with external devices. The I/O unit 140c may receive or output image information/signal, audio information/signal, data, and/or information input from a user. The I/O unit 140c may include a camera, a microphone, a user input unit, a display 140d, a speaker, and/or a haptic module.

For example, in the case of data communication, the I/O unit 140c acquires information/signals (e.g., touch, text, voice, image, video) input from the user, and the acquired information/signal may be stored in the memory unit 130. The communication unit 110 may convert the information/signal stored in the memory into a wireless signal and transmit the converted wireless signal directly to another wireless device or to a base station. In addition, after receiving a wireless signal from another wireless device or a base station, the communication unit 110 may restore the received wireless signal to the original information/signal. After the restored information/signal is stored in the memory unit 130, the restored information/signal may be output in various forms (e.g., text, voice, image, video, haptic) through the I/O unit 140*c*.

Figure 26:
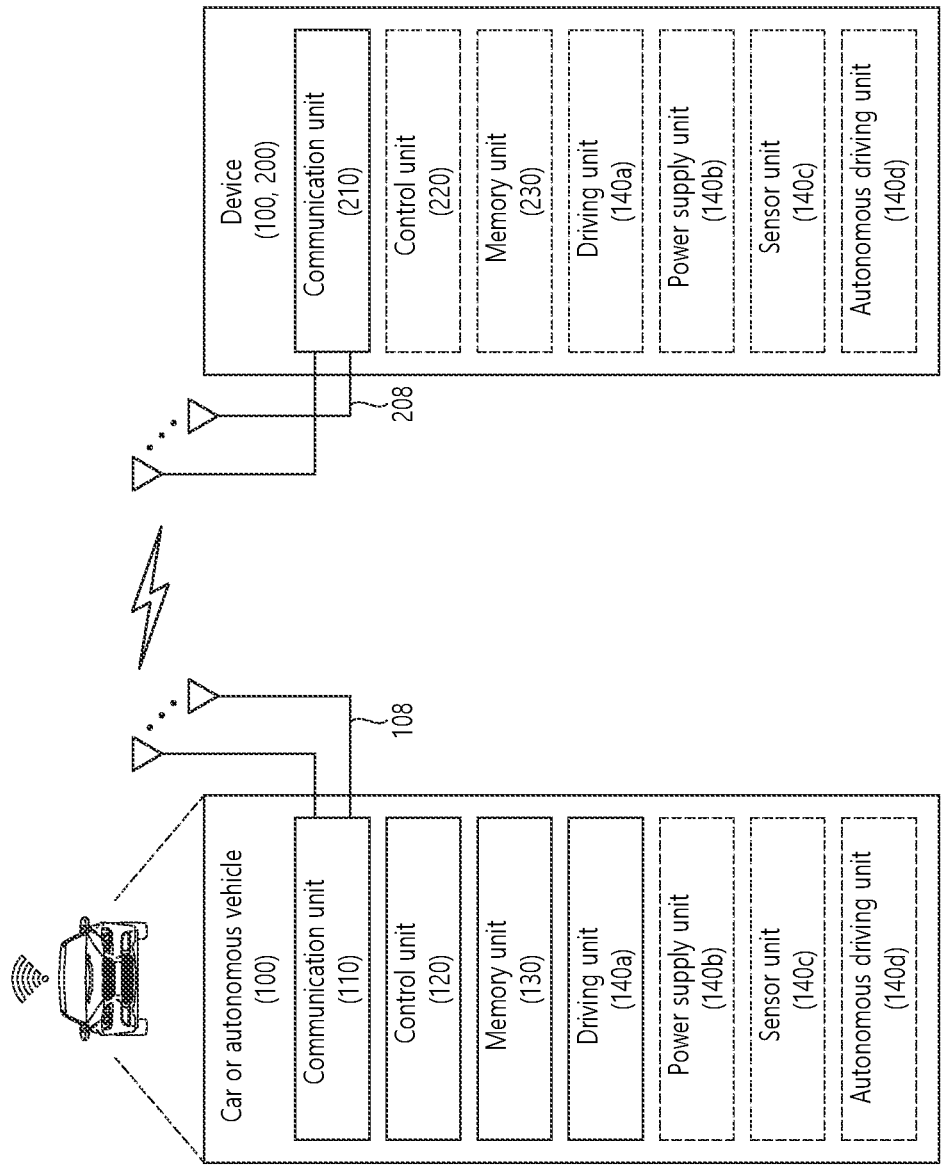
FIG. 26 illustrates a vehicle or an autonomous vehicle to which the present disclosure is applied.

FIG. 26 illustrates a vehicle or an autonomous vehicle to which the present disclosure is applied. The vehicle or autonomous vehicle may be implemented as a mobile robot, a vehicle, a train, an aerial vehicle (AV), or a ship.

Referring to FIG. 26, a vehicle or an autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. Blocks 110/130/140*a* to 140*d* correspond to blocks 110/130/140 of FIG. 24, respectively.

The communication unit 110 may transmit and receive signals (e.g., data, control signals, etc.) with external devices such as other vehicles, base stations (e.g. base stations, roadside base stations, etc.), and servers. The control unit 120 may perform various operations by controlling elements of the vehicle or the autonomous vehicle 100. The control unit 120 may include an electronic control unit (ECU). The driving unit 140*a* may cause the vehicle or the autonomous vehicle 100 to travel on the ground. The driving unit 140*a* may include an engine, a motor, a power train, a wheel, a brake, a steering device, and the like. The power supply unit 140*b* supplies power to the vehicle or the autonomous vehicle 100 and may include a wired/wireless charging circuit, a battery, and the like. The sensor unit 140*c* may obtain a vehicle status, surrounding environment information, user information, and the like. The sensor unit 140*c* may include an inertial measurement unit (IMU) sensor, a collision sensor, a wheel sensor, a speed sensor, an inclination sensor, a weight detection sensor, a heading sensor, a position module, a vehicle advancement/reverse sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement a technology that maintains a driving lane, a technology that automatically adjusts a speed such as adaptive cruise control, a technology that automatically drives along a predetermined route, and a technology that automatically sets a route and drives along the route when a destination is set.

For example, the communication unit 110 may receive map data, traffic information data, and the like from an external server. The autonomous driving unit 140*d* may generate an autonomous driving route and a driving plan based on the acquired data. The control unit 120 may control the driving unit 140*a* so that the vehicle or the autonomous driving vehicle 100 moves along the autonomous driving route according to the driving plan (e.g., speed/direction adjustment). During autonomous driving, the communication unit 110 may aperiodically/periodically acquire the latest traffic information data from the external server and may acquire surrounding traffic information data from nearby vehicles. In addition, during autonomous driving, the sensor unit 140*c* may acquire a vehicle state and surrounding environment information. The autonomous driving unit 140*d* may update the autonomous driving route and the driving plan based on newly acquired data/information. The communication unit 110 may transmit information on a vehicle location, the autonomous driving route, and the driving plan to the external server. The external server may predict traffic information data in advance using an AI technology or the like based on information collected from the vehicle or autonomous vehicle and may provide the predicted traffic information data to the vehicle or autonomous vehicle.

Figure 27:
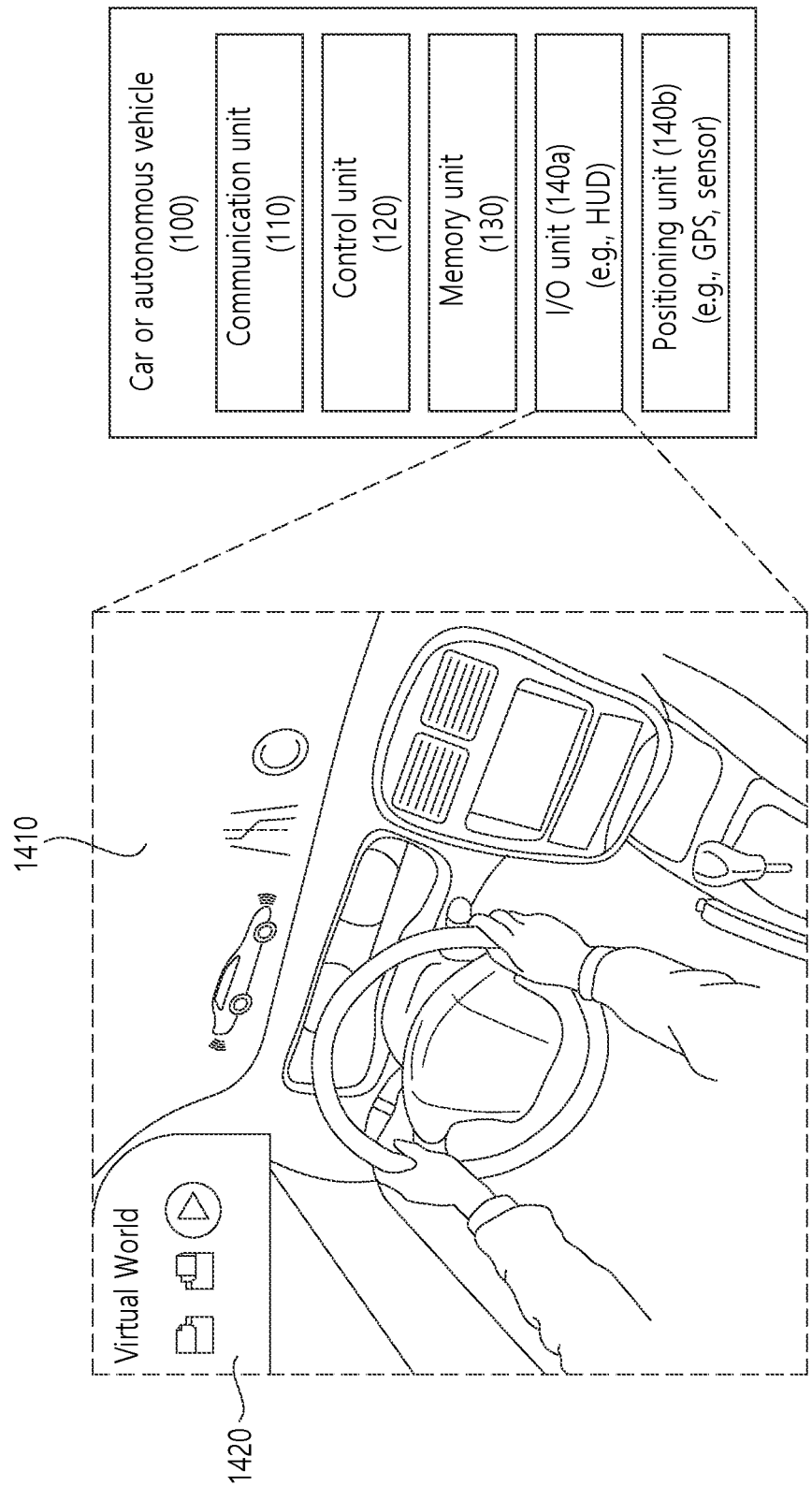
FIG. 27 illustrates a vehicle applied to the present disclosure.

FIG. 27 illustrates a vehicle applied to the present disclosure. The vehicle may also be implemented as means of transportation, trains, aircraft, and ships.

Referring to FIG. 27, the vehicle 100 may include a communication unit 110, a control unit 120, a memory unit 130, an I/O unit 140*a*, and a positioning unit 140*b*. Here, blocks 110 to 130/140*a* to 140*b* correspond to blocks 110 to 130/140 of FIG. 24, respectively.

The communication unit 110 may transmit and receive signals (e.g., data, control signals, etc.) with other vehicles or external devices such as a base station. The control unit 120 may perform various operations by controlling components of the vehicle 100. The memory unit 130 may store data/parameters/programs/codes/commands supporting various functions of the vehicle 100. The I/O unit 140*a* may output an AR/VR object based on information in the memory unit 130. The I/O unit 140*a* may include an HUD. The positioning unit 140*b* may acquire location information of the vehicle 100. The location information may include absolute location information of the vehicle 100, location information within a driving line, acceleration information, location information with nearby vehicles, and the like. The positioning unit 140*b* may include GPS and various sensors.

As an example, the communication unit 110 of the vehicle 100 may receive map information, traffic information, etc. from the external server and store the same in the memory unit 130. The positioning unit 140*b* may acquire vehicle location information through GPS and various sensors and store the vehicle location information in the memory unit 130. The control unit 120 may generate a virtual object based on map information, traffic information, vehicle location information, and the like, and the I/O unit 140*a* may display the generated virtual object on a window of the vehicle (1410, 1420). In addition, the control unit 120 may determine whether the vehicle 100 is operating normally within a driving line based on the vehicle location information. When the vehicle 100 deviates from the driving line abnormally, the control unit 120 may display a warning on a windshield of the vehicle through the I/O unit 140*a*. In addition, the control unit 120 may broadcast a warning message regarding a driving abnormality to nearby vehicles through the communication unit 110. Depending on the situation, the control unit 120 may transmit location information of the vehicle and information on driving/vehicle abnormalities to a related organization through the communication unit 110.

Figure 28:
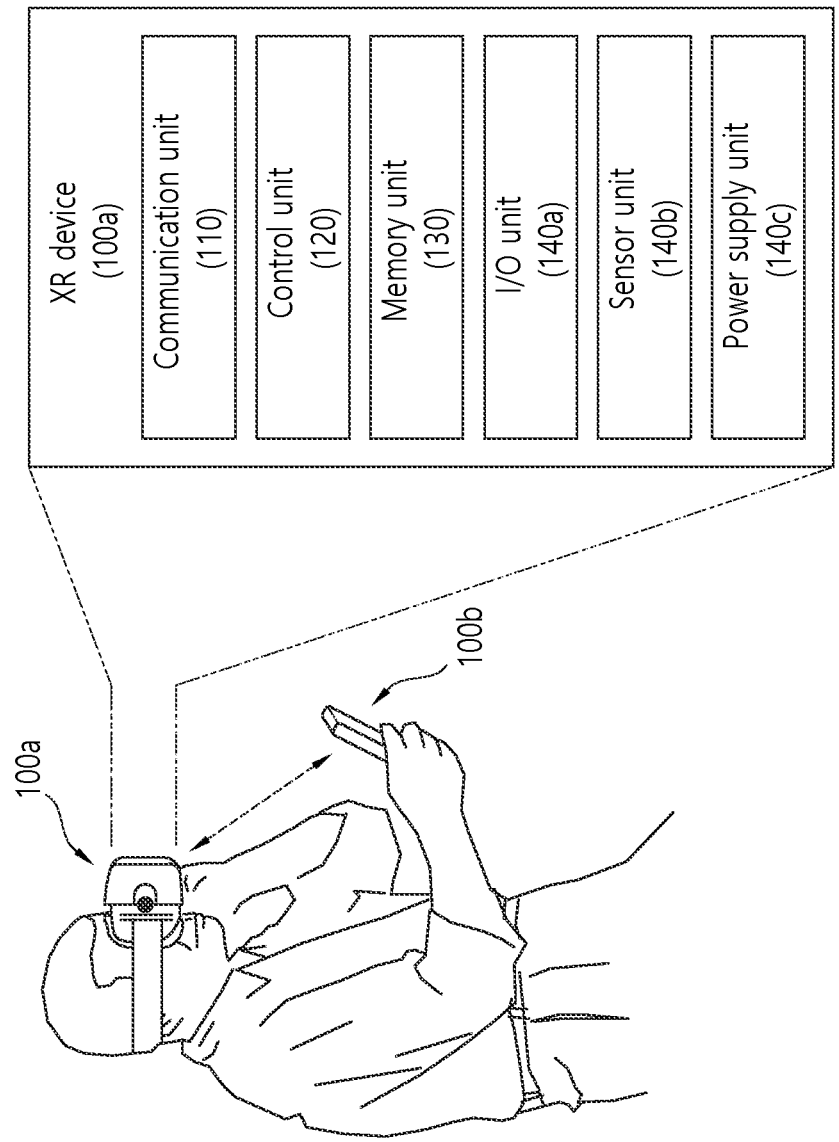
FIG. 28 illustrates an XR device applied to the present disclosure.

FIG. 28 illustrates an XR device applied to the present disclosure. The XR device may be implemented as an HMD, a head-up display (HUD) provided in a vehicle, a television, a smartphone, a computer, a wearable device, a home appliance, a digital signage, a vehicle, a robot, and the like.

Referring to FIG. 28, the XR device 100*a* may include a communication unit 110, a control unit 120, a memory unit 130, an I/O unit 140*a*, a sensor unit 140*b*, and a power supply unit 140*c*. Here, blocks 110 to 130/140*a* to 140*c* correspond to blocks 110 to 130/140 of FIG. 24, respectively.

The communication unit 110 may transmit and receive signals (e.g., media data, control signals, etc.) with other wireless devices, portable devices, or external devices such as a media server. The media data may include video, images, and sound. The control unit 120 may perform various operations by controlling components of the XR device 100*a*. For example, the control unit 120 may be configured to control and/or perform procedures such as video/image acquisition, (video/image) encoding, and metadata generating and processing. The memory unit 130 may store data/parameters/programs/codes/commands required for driving the XR device 100*a*/generating an XR object. The I/O unit 140*a* may acquire control information, data, etc. from the outside and may output the generated XR object. The I/O unit 140*a* may include a camera, a microphone, a user input unit, a display unit, a speaker, and/or a haptic module. The sensor unit 140*b* may obtain an XR device status, surrounding environment information, user information, and the like. The sensor unit 140*b* may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar. The power supply unit 140*c* supplies power to the XR device 100*a* and may include a wired/wireless charging circuit, a battery, and the like.

As an example, the memory unit 130 of the XR device 100*a* may include information (e.g., data, etc.) necessary for generating an XR object (e.g., AR/VR/MR object). The I/O unit 140*a* may acquire a command to operate the XR device 100*a* from the user, and the control unit 120 may drive the XR device 100*a* according to the user's driving command. For example, when the user tries to watch a movie, news, etc. through the XR device 100*a*, the control unit 120 may transmit content request information to another device (for example, the portable device 100*b*) or a media server through the communication unit 130. The communication unit 130 may download/stream content such as movies and news from another device (e.g., the portable device 100*b*) or a media server to the memory unit 130. The control unit 120 may control and/or perform procedures such as video/image acquisition, (video/image) encoding, and metadata generating/processing for the content and generate/output an XR object based on information on a surrounding space or a real object acquired through the I/O unit 140*a*/sensor unit 140*b*.

In addition, the XR device 100*a* may be wirelessly connected to the portable device 100*b* through the communication unit 110, and the operation of the XR device 100*a* may be controlled by the portable device 100*b*. For example, the portable device 100*b* may operate as a controller for the XR device 100*a*. To this end, the XR device 100*a* may acquire 3D location information of the portable device 100*b* and then generate and output an XR object corresponding to the portable device 100*b*.

Figure 29:
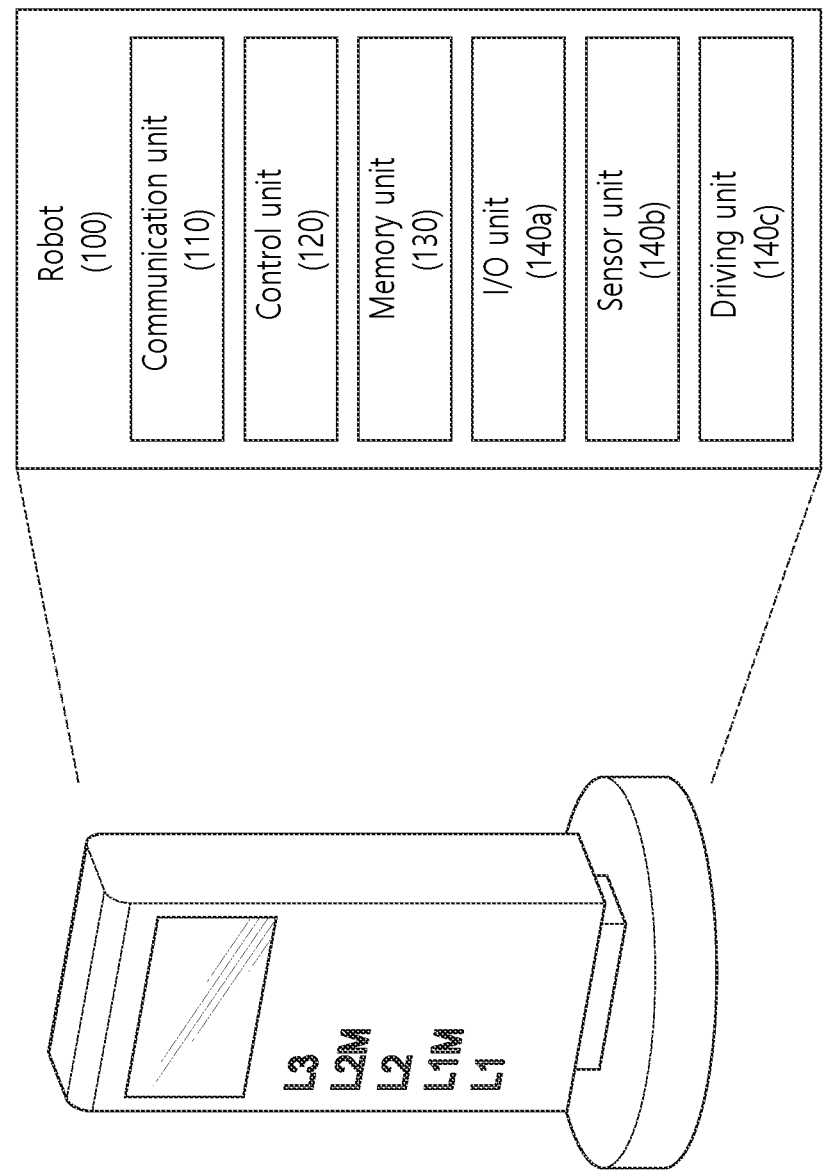
FIG. 29 illustrates a robot applied to the present disclosure.

FIG. 29 illustrates a robot applied to the present disclosure. Robots may be classified into industrial, medical, household, and military robots depending on the purpose or field of use.

Referring to FIG. 29, the robot 100 may include a communication unit 110, a control unit 120, a memory unit 130, an I/O unit 140*a*, a sensor unit 140*b*, and a driving unit 140*c*. Here, blocks 110 to 130/140*a* to 140*c* correspond to blocks 110 to 130/140 of FIG. 24, respectively.

The communication unit 110 may transmit and receive signals (e.g., driving information, control signals, etc.) with other wireless devices, other robots, or external devices such as a control server. The control unit 120 may perform various operations by controlling components of the robot 100. The memory unit 130 may store data/parameters/programs/codes/commands supporting various functions of the robot 100. The I/O unit 140*a* may acquire information from the outside of the robot 100 and may output information to the outside of the robot 100. The I/O unit 140*a* may include a camera, a microphone, a user input unit, a display unit, a speaker, and/or a haptic module. The sensor unit 140*b* may obtain internal information, surrounding environment information, user information, and the like of the robot 100. The sensor unit 140*b* may include a proximity sensor, an illuminance sensor, an acceleration sensor, a magnetic sensor, a gyro sensor, an inertial sensor, an IR sensor, a fingerprint recognition sensor, an ultrasonic sensor, an optical sensor, a microphone, a radar, and the like. The driving unit 140*c* may perform various physical operations such as moving a robot joint. In addition, the driving unit 140*c* may cause the robot 100 to travel on the ground or fly in the air. The driving unit 140*c* may include an actuator, a motor, a wheel, a brake, a propeller, and the like.

Figure 30:
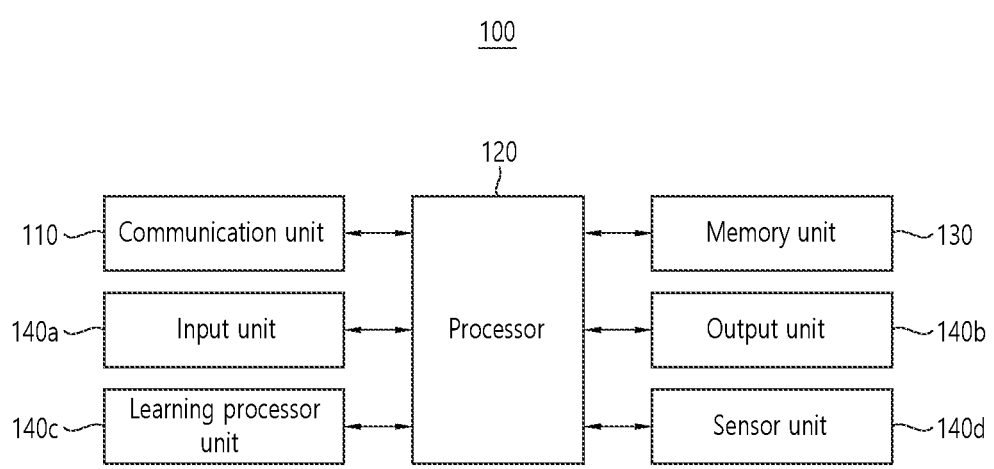
FIG. 30 illustrates an AI device applied to the present disclosure.

FIG. 30 illustrates an AI device applied to the present disclosure. AI devices may be implemented as fixed devices or mobile devices such as TVs, projectors, smartphones, PCs, notebooks, digital broadcasting terminals, tablet PCs, wearable devices, set-top boxes (STBs), radios, washing machines, refrigerators, digital signage, robots, vehicles, etc.

Referring to FIG. 30, the AI device 100 includes a communication unit 110, a control unit 120, a memory unit 130, input/output units 140*a* and 140*b*, a learning processor unit 140*c*, and a sensor unit 140*d*. Blocks 110 to 130/140*a* to 140*d* correspond to blocks 110 to 130/140 of FIG. 24, respectively.

The communication unit 110 may transmit or receive wired/wireless signals (e.g., sensor information, user inputs, learning models, control signals, etc.) with external devices such as other AI devices (e.g., FIGS. 21, 100*x*, 200, 400) or external devices such as the AI server 200. To this end, the communication unit 110 may transmit information in the memory unit 130 to an external device or may transmit a signal received from the external device to the memory unit 130.

The control unit 120 may determine at least one executable operation of the AI device 100 based on information determined or generated using a data analysis algorithm or a machine learning algorithm. In addition, the control unit 120 may perform a determined operation by controlling the components of the AI device 100. For example, the control unit 120 may request, search, receive, or utilize data of the learning processor unit 140*c* or the memory unit 130 and control components of the AI device 100 to execute a predicted operation or an operation determined to be desirable among at least one executable operation. In addition, the control unit 120 may collect history information including the user's feedback on the operation content or the operation of the AI device 100 and stores the collected history information in the memory unit 130 or the learning processor unit 140*c* or transmit the history information to the external device such as the AI server (400 of FIG. 21). The collected history information may be used to update a learning model.

The memory unit 130 may store data supporting various functions of the AI device 100. For example, the memory unit 130 may store data obtained from the input unit 140*a*, data obtained from the communication unit 110, output data from the learning processor unit 140c, and data obtained from the sensing unit 140. In addition, the memory unit 130 may store control information and/or software codes necessary for the operation/execution of the control unit 120.

The input unit 140a may acquire various types of data from the outside of the AI device 100. For example, the input unit 120 may acquire learning data for model learning and input data to which the learning model is to be applied. The input unit 140a may include a camera, a microphone, and/or a user input unit. The output unit 140b may generate output related to visual, auditory, or tactile sensation. The output unit 140b may include a display unit, a speaker, and/or a haptic module. The sensing unit 140 may obtain at least one of internal information of the AI device 100, surrounding environment information of the AI device 100, and user information using various sensors. The sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and/or a radar.

The learning processor unit 140c may train a model composed of an artificial neural network using the learning data. The learning processor unit 140c may perform AI processing together with the learning processor unit of the AI server (400 of FIG. 21). The learning processor unit 140c may process information received from an external device through the communication unit 110 and/or information stored in the memory unit 130. In addition, an output value of the learning processor unit 140c may be transmitted to an external device through the communication unit 110 and/or may be stored in the memory unit 130.

What is claimed is:

1. A method for performing a sidelink operation in a wireless communication system, the method performed by a user equipment (UE) and comprising:
   determining a time unit for the sidelink operation; and
   performing the sidelink operation based on the time unit,
   wherein the time unit is semi-statically configured as an uplink,
   wherein the time unit is configured based on information related to a sidelink symbol duration and information related to a sidelink starting symbol location, and
   wherein the time unit is configured based on consecutive uplink symbols.

2. The method of claim 1, wherein a sidelink resource pool bitmap is applied based on the time unit.

3. The method of claim 1, wherein the information related to the sidelink symbol duration and the information related to the sidelink starting symbol location are received through a higher layer signaling from a base station.

4. The method of claim 1, wherein the information related to the sidelink symbol duration and the information related to the sidelink starting symbol location are pre-configured.

5. The method of claim 1, wherein a numerology of the time unit is differently configured from a numerology of an uplink.

6. The method of claim 1, wherein the consecutive uplink symbols are located within a slot.

7. The method of claim 6, wherein the consecutive uplink symbols satisfy the information related to the sidelink symbol duration and the information related to the sidelink starting symbol location.

8. A user equipment (UE) configured to perform a sidelink operation in a wireless communication system, the UE comprising:
   a transceiver;
   at least one processor; and
   at least one computer memory operably connectable to the at least one processor and storing instructions that, when executed by the at least one processor, perform operations comprising:
   determining a time unit for the sidelink operation; and
   performing the sidelink operation based on the time unit,
   wherein the time unit is semi-statically configured as an uplink, and
   wherein the time unit is configured based on information related to a sidelink symbol duration and information related to a sidelink starting symbol location, and
   wherein the time unit is configured based on consecutive uplink symbols.

9. An apparatus configured to control a user equipment (UE) to perform a sidelink operation in a wireless communication system, the apparatus comprising:
   at least one processor; and
   at least one computer memory operably connectable to the at least one processor and storing instructions that, when executed by the at least one processor, perform operations comprising:
   determining a time unit for the sidelink operation; and
   performing the sidelink operation based on the time unit,
   wherein the time unit is semi-statically configured as an uplink, and
   wherein the time unit is configured based on information related to a sidelink symbol duration and information related to a sidelink starting symbol location, and
   wherein the time unit is configured based on consecutive uplink symbols.

* * * * *